United States Patent [19]

Horstmann et al.

[11] Patent Number: 5,491,806
[45] Date of Patent: Feb. 13, 1996

[54] OPTIMIZED TRANSLATION LOOKASIDE BUFFER SLICE HAVING STORED MASK BITS

[75] Inventors: Jens Horstmann, Sunnyvale; Yoon Kim, Danville, both of Calif.

[73] Assignee: LSI Logic Corporation, Milpitas, Calif.

[21] Appl. No.: 543,936

[22] Filed: Jun. 26, 1990

[51] Int. Cl.$^6$ .................................................. G06F 12/10
[52] U.S. Cl. ........................................ 395/417; 395/419
[58] Field of Search ................... 365/49, 120; 395/400, 395/425; 364/200 MS File, 900 MS File

[56] References Cited

U.S. PATENT DOCUMENTS

| | | | |
|---|---|---|---|
| 4,580,240 | 4/1986 | Watanabe | 365/49 |
| 4,622,653 | 11/1986 | McElroy | 365/49 |
| 4,648,033 | 3/1987 | Lewis et al. | 395/400 |
| 4,723,224 | 2/1988 | Van Hulett et al. | 365/49 |
| 4,783,735 | 11/1988 | Miu et al. | 395/425 |
| 4,843,542 | 6/1989 | Dashiell et al. | 395/425 |
| 4,852,059 | 7/1989 | Oates | 365/49 |
| 4,910,668 | 3/1990 | Okamoto et al. | 395/400 |
| 4,928,260 | 5/1990 | Chuang et al. | 365/49 |
| 4,970,643 | 11/1990 | Cramm | 395/400 |
| 5,034,919 | 7/1991 | Sasai et al. | 365/49 |
| 5,067,078 | 11/1991 | Talgam et al. | 395/400 |
| 5,088,066 | 2/1992 | Castro | 365/49 |
| 5,109,496 | 4/1992 | Beausoleil et al. | 395/400 |
| 5,133,058 | 7/1992 | Jensen | 365/49 |

OTHER PUBLICATIONS

LSI Logic Corporation, "L64815 Memory Management, Cache Control, and Cache Tags Unit Technical Manual". Mar. 1990.

Hiroshi Kadota et al., "A 32-bit CMOS Microprocessor with On–Chip Cache and TLB", IEEE Journal of Solid–State Circuits, vol. SC–22, No. 5, Oct. 1987, pp. 800–806.

Dave Bursky, "Sparc Memory Managers Run Multiprocessing/Packing Memory–Management Logic, Cache Tags, Cache Control, A CMOS IC Simplifies RISC Memory Systems", Electronic Design, Mar. 23, 1989, pp. 93, 94 and 96.

David A. Patterson et al., "Computer Architecture: A Quantitative Approach", Morgan Kaufmann Publishers, Inc., San Mateo CA, pp. 489–507.

*Primary Examiner*—Jack A. Lane
*Attorney, Agent, or Firm*—Skjerven, Morrill, MacPherson, Franklin & Friel; Paul J. Winters; David W. Heid

[57] ABSTRACT

An optimized translation lookaside buffer (TLB) utilizes a least-recently-used algorithm for determining the replacement of virtual-to-physical memory translation entries. The TLB is faster and requires less chip area for fabrication. In addition to speed and size, the TLB is also optimized since many characteristics of the TLB may be changed without significantly changing the overall layout of the TLB. A TLB generating program may thus be used as a design aid. The translation lookaside buffer includes a level decoding circuit which allows masking of a variable number of the bits of a virtual address when it is compared to values stored within the TLB. The masking technique may be used for indicating a TLB hit or miss of a virtual address to be translated, and may also be used for invalidating selected entries within the TLB. The TLB also implements a pipelining technique wherein a LRU comparator compares the least significant bits of a LRU counter at the same time when the most significant bits of the LRU counter are being incremented. Finally, an address decoder is provided within the TLB for indexing each slice during a test mode to check for malfunctions.

3 Claims, 33 Drawing Sheets

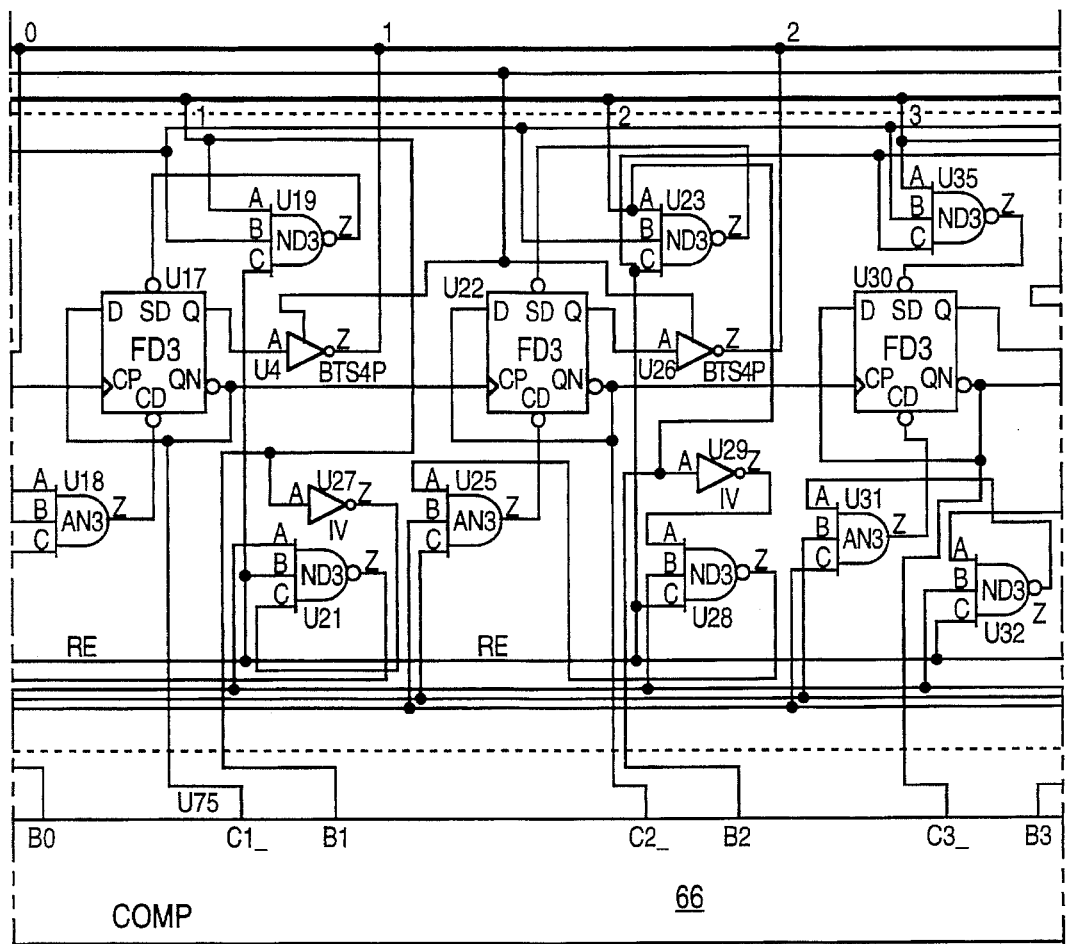
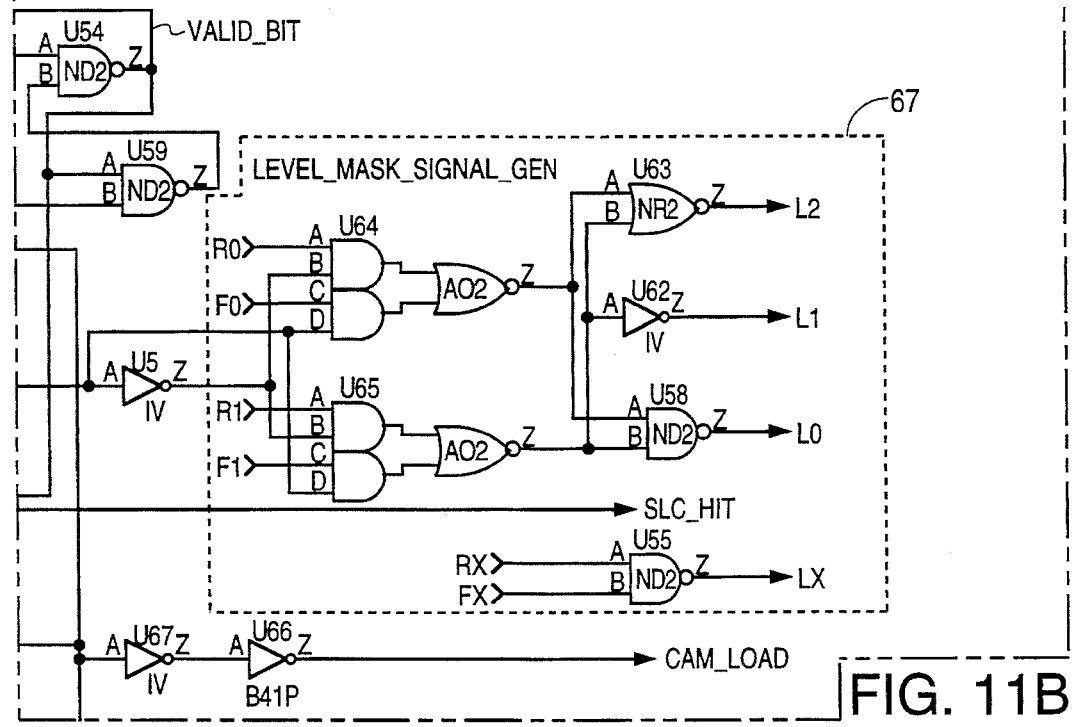
FIG. 11B

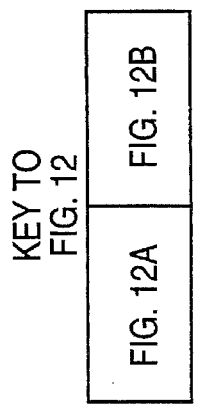
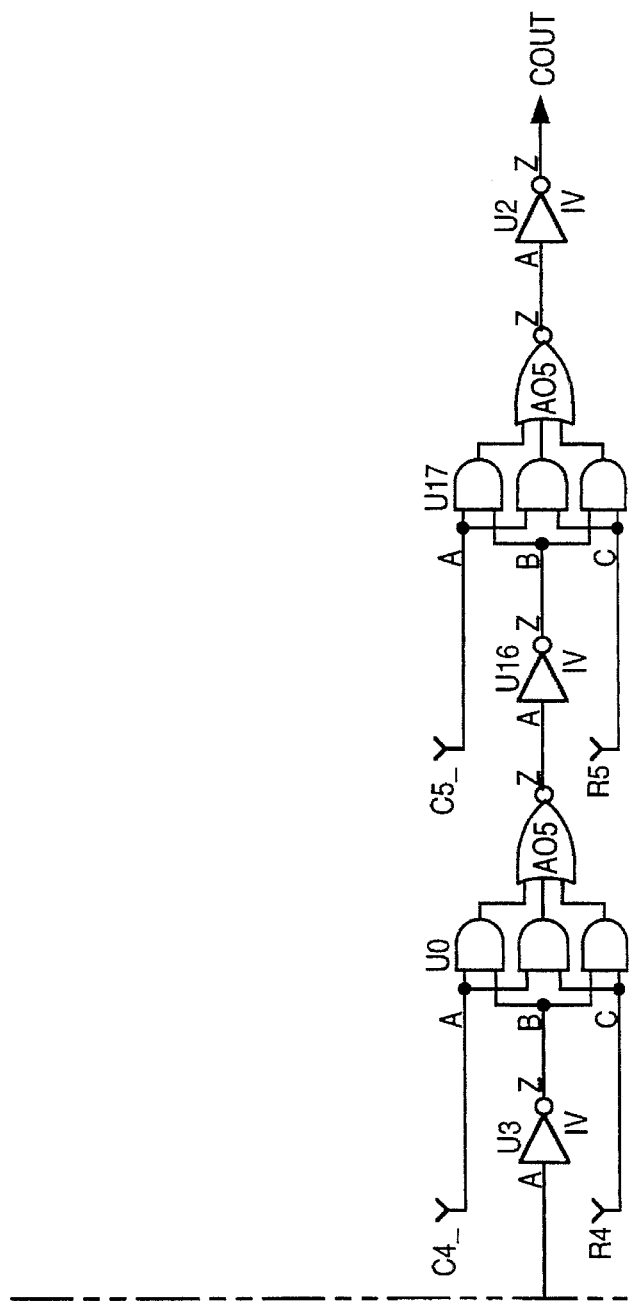
FIG. 12B

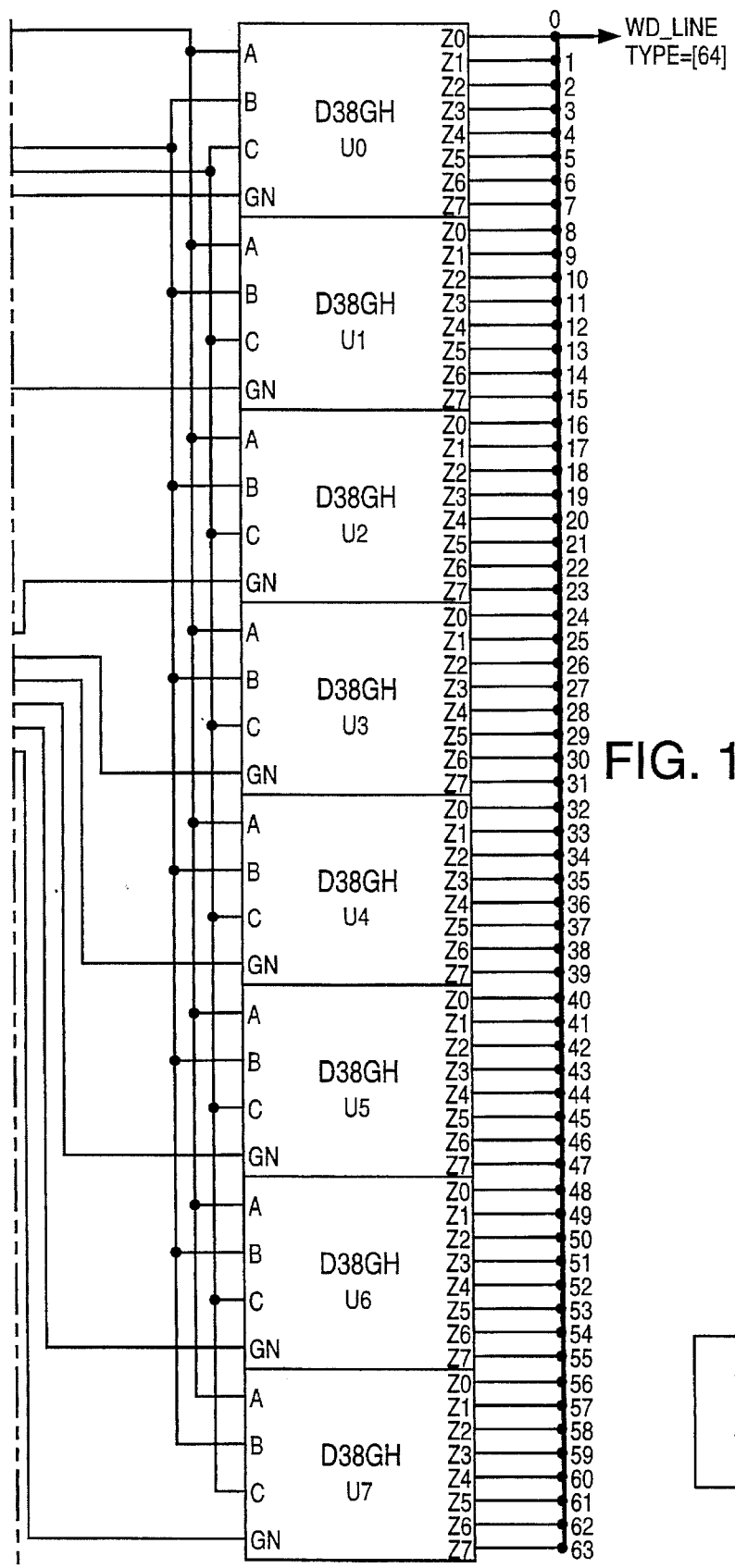
FIG. 15B
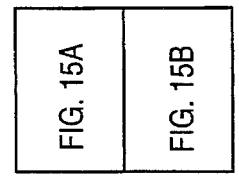
KEY TO FIG. 15

OPTIMIZED TRANSLATION LOOKASIDE BUFFER SLICE HAVING STORED MASK BITS

BACKGROUND OF THE INVENTION

1. Field of the Invention

The invention relates to memory management systems for computers and more particularly to translation lookaside buffers.

2. Description of the Relevant Art

There are several modern computer architectures having operating systems that allow multiple processes to execute simultaneously. Since it would be too expensive to dedicate a full-address-space worth of memory for each process, especially since many processes use only a small part of their address space, there must be a means of sharing a smaller amount of physical memory between many processes. One way to do this, virtual memory, divides physical memory into blocks and allocates them to different processes.

While virtual memory is common for current computers, program sharing is not the reason virtual memory was invented. In former days if a program became too large for physical memory, it was up to the programmer to make it fit. Programmers divided programs into pieces and then identified the pieces that were mutually exclusive. These pieces, or "overlays", were loaded or unloaded under user program control during execution, with the programmer ensuring that the program never attempted to access more physical main memory than in the machine. This responsibility eroded programmer productivity. Virtual memory, which was invented to relieve programmers of this burden, automatically managed the two levels of the memory hierarchy represented by main memory and secondary storage.

The allocation of main memory to multiple processes is performed by a combination of hardware and software. To efficiently support multiple processes, a virtual memory system includes a memory management scheme that allows several processes to share main memory at the same time. The memory management scheme maps processes into separate areas of main memory and protects processes from interfering with one another.

In many systems, the memory management scheme is implemented by a part of the operating system kernel called memory management software and by a block of hardware called the memory management unit (MMU). The memory management software decides where to place a process in main memory and the MMU actually maps the process into the area of memory allocated to it.

Commonly, the memory management software allocates memory to processes in pages of memory, not byte by byte. Both virtual address space and physical address space are divided into pages. The use of pages limits memory management overhead and provides an efficient use of main memory. For example, a process's main memory allocation need not be contiguous; processes in main memory can be interleaved. In addition, although few processes completely fill the last page allocated to them, the amount of memory wasted is small compared to the overall size of physical memory.

FIG. 1 shows an example of how this scheme is used in a computer system to map the virtual address space of two processes into the physical address space of main memory. In the figure, the page numbers for Processes 1 and 2 are virtual page numbers, and the page numbers in physical address space are physical page numbers. Note that contiguous virtual pages of the two processes are not necessarily contiguous as they are mapped into physical address space.

The MMU of the computer system maps a process into main memory by translating the virtual addresses generated by the process into the physical addresses that correspond to the pages of main memory allocated to the process. Since translation is done on a page basis, it is useful to divide both virtual and physical addresses into a page offset and a page number. For example, as shown in FIG. 2, the low-order n+1 bits of each address comprise the page offset, which specifies a particular byte within a page. The high-order m−n bits of the virtual address comprise the virtual page number. The virtual address comprises a total of m+1 bits. The high-order p−n bits of the physical address comprise the physical page number. The physical address comprises a total of p+1 bits. Translating a virtual address to a physical address is simply a matter of replacing the virtual page number with the physical page number.

When memory management software allocates main memory to a process, the software determines the physical page number for each of the process's virtual pages and stores the physical page numbers in tables in main memory. When an address is presented to the MMU for translation, the MMU uses the virtual address to fetch the appropriate physical page number out of the tables in main memory. Having fetched the physical page number, the MMU replaces the virtual page number with the physical page number. The MMU does not change the page offset since the addressed byte is in the same relative position in both the virtual and physical page.

Memory management software stores the physical page number for each virtual page in a translation table in main memory. Although a single table could be used to map the system's entire virtual address space into main memory, such a table for many situations would be excessively large. For example, if the virtual address space is 32 bits wide, the table would have over one million entries. In addition, every active process must have its own table. Since most processes do not need the entire virtual address space available to them, most of the entries in each process's table would be marked as unused. Maintaining a one-million entry table for each active process would impose a significant overhead burden on both memory management software and hardware resources.

This memory management problem is solved by dividing the virtual memory for each process into a hierarchy of memory parcels having various sizes. For example, FIG. 3 illustrates one way the virtual memory can be divided into a hierarchy of memory parcels. In this example, memory parcels of four different sizes are possible. The largest memory parcels are labelled contexts, the second largest parcels are labelled regions, the third largest parcels are labelled segments, and finally, the smallest parcels are labelled pages. The memory parcels are hierarchical because a process's area in main memory (its context) contains multiple regions, a region contains multiple segments, and a segment contains multiple pages. Taken together, these areas comprise the context in which the process runs. There is a context for each active process, and the operating system software maps each process to a particular context.

This hierarchical memory scheme greatly simplifies memory management by reducing the size of translation tables and, therefore, the overhead required to set them up and maintain them. For example, since a process rarely requires all the available virtual address space, memory management software can simply flag entire unused regions and segments as invalid; thus the software does not have to mark a million translation table entries individually (one per page) as invalid.

This hierarchical scheme has another valuable benefit. If a process executes more efficiently using a larger page size, larger-sized memory parcels (i.e., regions or segments) having wider bit ranges can be allocated as the smallest-sized memory parcels utilized, thereby effectively enlarging the page size.

The size chosen for each page determines the size of the translation table and the amount of wasted storage space. The size of the translation table is inversely proportional to the page size, and hence memory can be saved by making pages bigger. In addition, for processes that are smaller, larger page sizes lengthen the time to invoke the process. Finally, transferring larger pages to or from secondary storage is more efficient than transferring smaller pages.

On the other hand, a small page size results in less wasted storage when a continuous region of virtual memory is not equal in size to a multiple of the page size. The portion of unused memory in a page is called internal fragmentation.

To implement the hierarchical approach for dividing virtual memory, the memory management scheme employs, for example, four levels of tables—the Context Table, Region Tables, Segment Tables, and Page Tables. FIG. 4 illustrates the four levels of tables implemented in a system having a 32-bit wide virtual address, although the approach may be similarly implemented for systems having larger or smaller virtual addresses. There is a single Context Table which contains 256 entries. Each entry represents a potential context. Active entries (ones that are being used) point to the Region Table for that context. Similarly, the Region Table contains 256 entries. Each active entry represents one active region in the context, and points to the Segment Table for that region. Similarly, there is a Segment Table for each region.

In the same fashion, the Segment Table holds 64 entries, one per segment, each entry pointing to the Page Table for that segment. Finally, each Page Table contains 64 entries. However, each active Page Table entry contains the physical page number of the addressed page, so the entry points to that page in physical memory, and not to another table. The process of translating virtual addresses to physical addresses for such a hierarchical approach is referred to as "table walking".

The Context, Region, Segment, and Page tables are each stored within a main memory. A disadvantage of using the hierarchical tables is the length of time required to table walk.

To increase the translation speed, therefore, computers use a cache dedicated to virtual address translations, called a translation lookaside buffer (TLB) or simply a translation buffer. A TLB is a high-speed cache which contains a small portion of the virtual-to-physical address translations found in the hierarchical tables. When the processor requests access to a virtual address, the bits constituting the virtual page number are received by the TLB. The TLB contains circuitry to determine whether a virtual page entry corresponding to the virtual page number received is stored in the TLB. If the TLB contains the virtual page entry, the physical page number corresponding to that virtual page is provided at an output bus of the TLB. The physical page number is combined with the bits constituting the page offset, resulting in the overall physical address location to be accessed. The event explained above occurring when the TLB contains the virtual page entry to be accessed is referred to as a TLB "hit".

If the TLB does not contain the virtual page entry corresponding to the virtual page number requested by the processor, the virtual page entry is loaded from the translation tables in main memory into the TLB, increasing the translation time due to table walking. The physical page number corresponding to the virtual page entry is output from main memory and loaded into a portion of memory within the TLB. The bits constituting the physical page number are combined with the page offset bits, resulting in the physical address location to be accessed. The event occurring when the TLB initially does not contain the virtual page entry to be accessed is referred to as a "miss".

To further increase translation speed, the translation lookaside buffer may be designed to implement a least-recently-used algorithm wherein recently used translation entries are stored in the TLB. Since there is a probability that recently used translations will be needed repetitively over a short period of time, the MMU can translate the recently used virtual addresses without table walking and hence translation time is reduced. When the MMU does not find a particular translation entry in the TLB, the MMU fetches the virtual to physical translation entry from the appropriate table in main memory by table walking. This virtual-to-physical translation entry is, in turn, stored within the TLB. For a least-recently-used (LRU) algorithm, the MMU discards the TLB's oldest or unused (flushed) translation entry and replaces it with the new one.

It is desirable to provide a translation lookaside buffer which on average has a high hit rate. It is further desirable to provide a translation lookaside buffer requiring minimal space, having a low power consumption, and capable of operating at high speeds.

SUMMARY OF THE INVENTION

An optimized translation lookaside buffer (TLB) utilizes a least-recently-used algorithm for determining the replacement of virtual-to-physical translation entries. The TLB of this invention is optimized since it is capable of operating at high speeds, requires a reduced chip area for fabrication, and supports efficient operation. The TLB also supports simplified diagnostic functions. Finally, the size and other characteristics of the TLB may be altered in a simplified and cost-effective manner.

In accordance with the invention, the TLB includes a level decoding circuit which allows masking of a variable number of the bits of a virtual page number or address when being compared to entries stored within a content addressable memory column of the TLB. The masking technique may be used to indicate a hit or miss for an entire virtual page number or selected bits of a virtual page number when compared to each virtual-to-physical translation entry stored within the TLB. Furthermore, the masking technique is also used for "flushing", or invalidating, an individual or a selected set of virtual-to-physical translations stored within the TLB.

The level decoding technique is implemented with a level decoding circuit which includes a plurality of first transistors which are each connected in series with a separate one of a plurality of second transistors between a reference voltage and a slice hit line. The slice hit line provides a signal indicative of the occurrence of a TLB slice hit. A control terminal of each of the plurality of first transistors is connected to an output line of an address comparator, and a masking control terminal of each of the plurality of second transistors is connected to receive a mask voltage. The presence or absence of the mask voltage determines whether an output signal from the address comparator can affect the voltage level on the slice hit line.

The level decoding circuit may also include at least one additional transistor coupled between the slice hit line and a second reference voltage for balancing or equalizing the rise time of the level decoding circuit to the fall time of the level decoding circuit.

Each virtual-to-physical storage location within the TLB, referred to as a slice, includes an LRU counter which contains a value indicative of the time at which a stored translation within the slice is used relative to the use of stored translations within the other slices. The LRU counters are ripple-type counters. Each LRU counter is connected to an LRU comparator which compares the value of the LRU counter to a reference value broadcasted on a bus. The TLB employs a pipelining technique wherein the LRU comparator compares the lower order bits of the LRU counter at the same time when the higher order bits of the LRU counter are being incremented. The pipelining technique reduces the overall time required to update the LRU counters and make consecutive comparisons, and hence the overall speed of the TLB is increased when translation entries within the TLB are repetitively accessed.

The TLB also includes an address decoder for indexing each slice of the TLB during a test mode to check for malfunctions in the TLB. The address decoder provides a direct route from exterior terminals of the TLB to each of the slices within the TLB for testing purposes.

Implementation of the present invention provides several additional advantages. Since the TLB is implemented using customized logic, as opposed to conventional logic, and since ripple counters are used, the overall size required to fabricate the TLB is minimized. Furthermore, the speed of the TLB is increased. In one embodiment of the invention, the area required to fabricate the TLB is one third the area required for a conventional TLB and the speed is twice as fast as the conventional TLB.

The TLB also allows an improved circuit layout wherein a reduced area is required for fabrication. The amount and size of memory and other characteristics of the TLB may be changed without significantly changing the circuit layout. A TLB generating program may be used as a design aid for simplifying the design of a specific TLB.

The invention will be more readily understood by reference to the drawings and the detailed description. As will be appreciated by one skilled in the art, the invention is applicable to translation lookaside buffers in general, and is not limited to the specific embodiment disclosed.

BRIEF DESCRIPTION OF THE DRAWINGS

FIGS. 11(A)–11(E) show a functional model of an LRU portion within a slice of the TLB.

FIGS. 12(A)–12(B) show a functional model of a ripple comparator within a slice of the TLB.

FIGS. 15(A)–15(B) show a schematic of address decoder circuitry used for testing the TLB.

TABLE OF ACRONYMS

CAM—Content Addressable Memory
LRU—Least-Recently-Used
MMU—Memory Management Unit
RAM—Random Access Memory
TLB—Translation Lookaside Buffer

DETAILED DESCRIPTION

Figure 1:
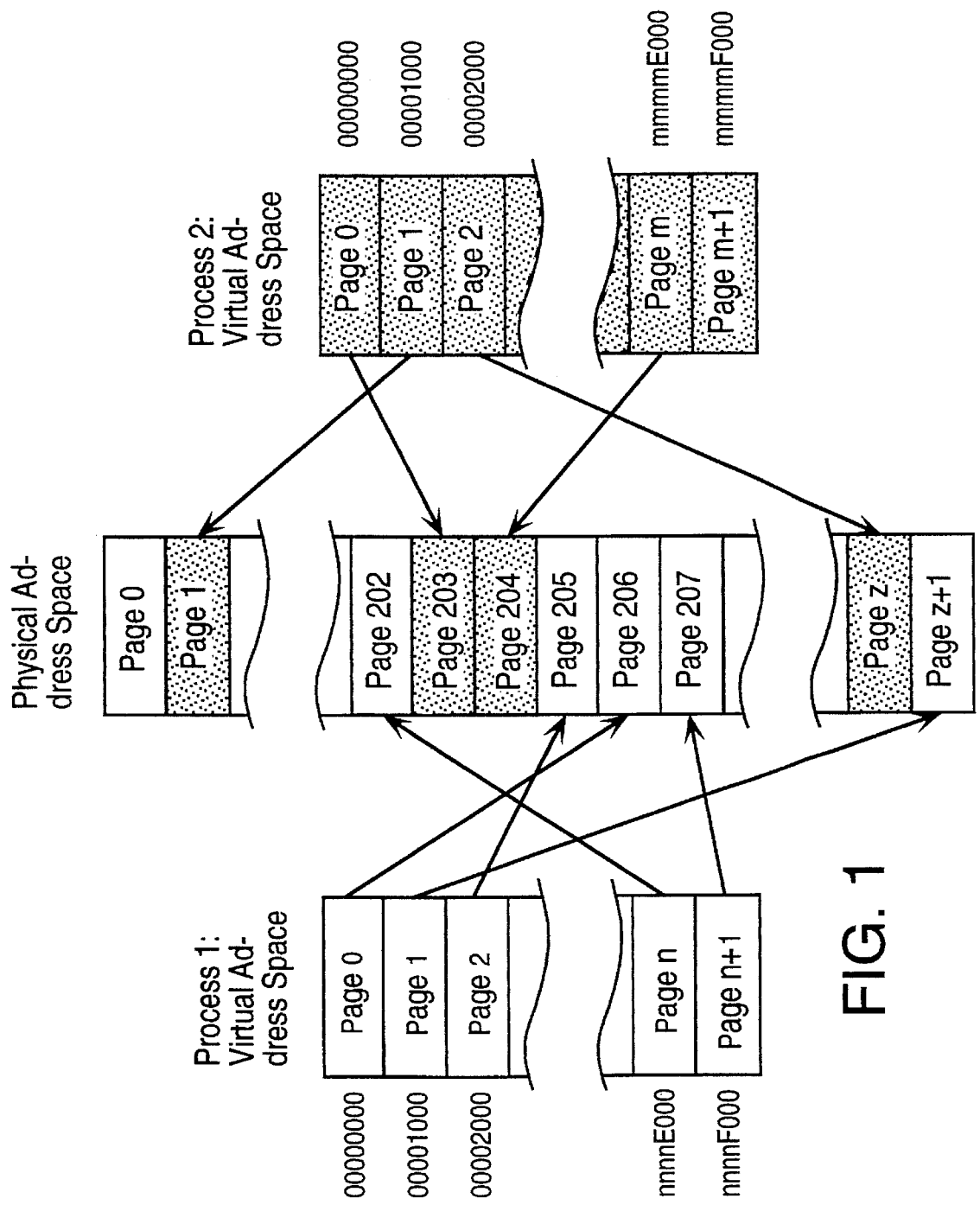
FIG. 1 shows an example of mapping the virtual address space of two processes into the physical address space of main memory.
Figure 2:
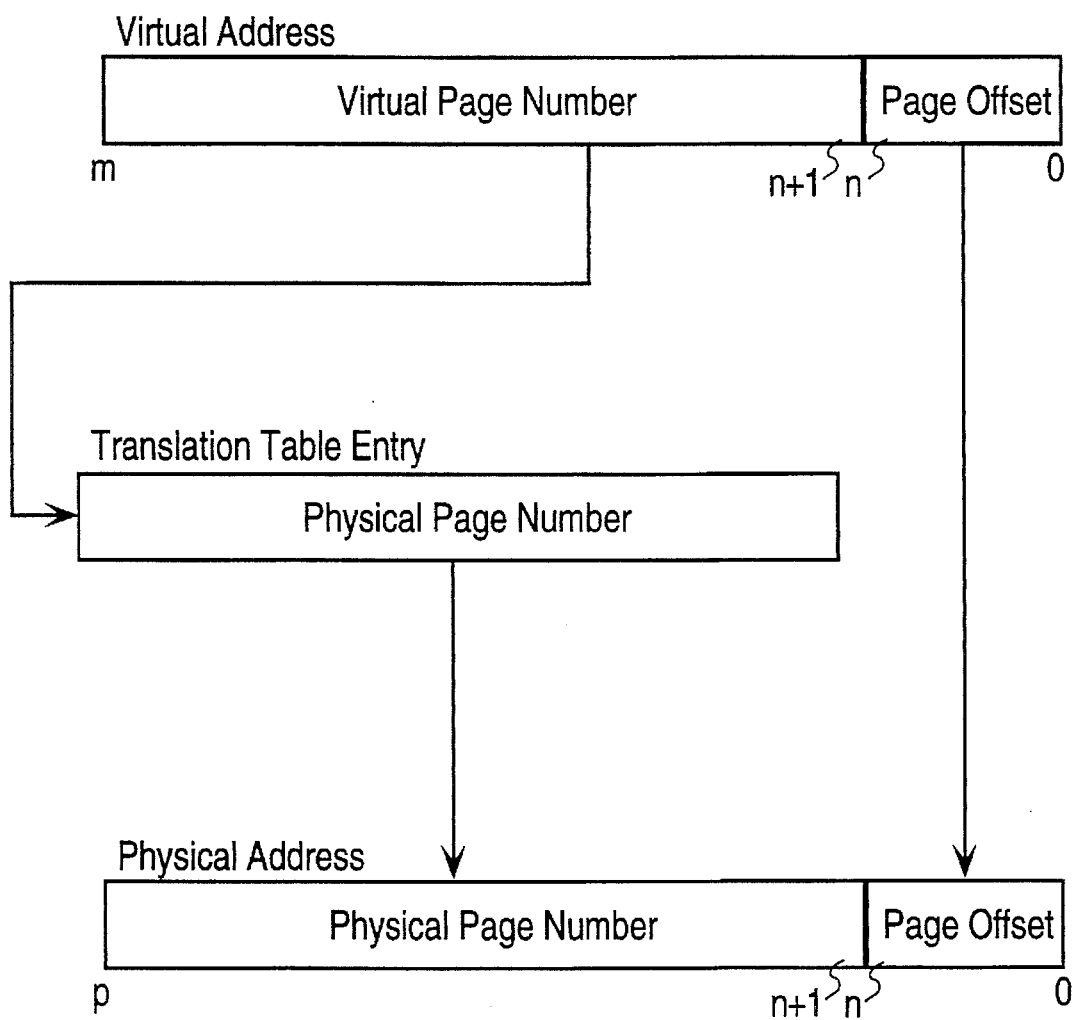
FIG. 2 shows the virtual address and physical address each divided into a page offset and a page number.
Figure 3:
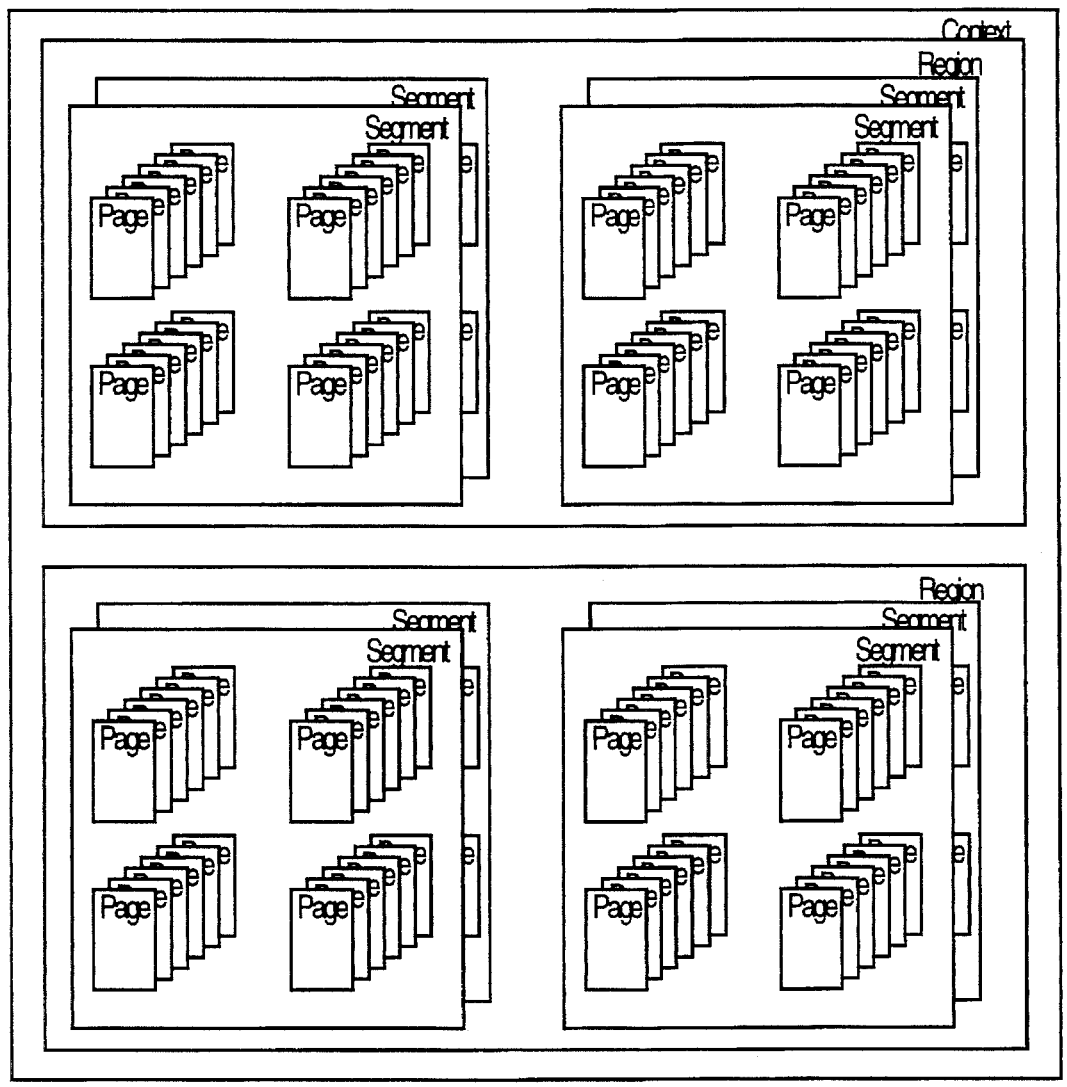
FIG. 3 illustrates a process's context with its regions, segments, and pages.
Figure 4:
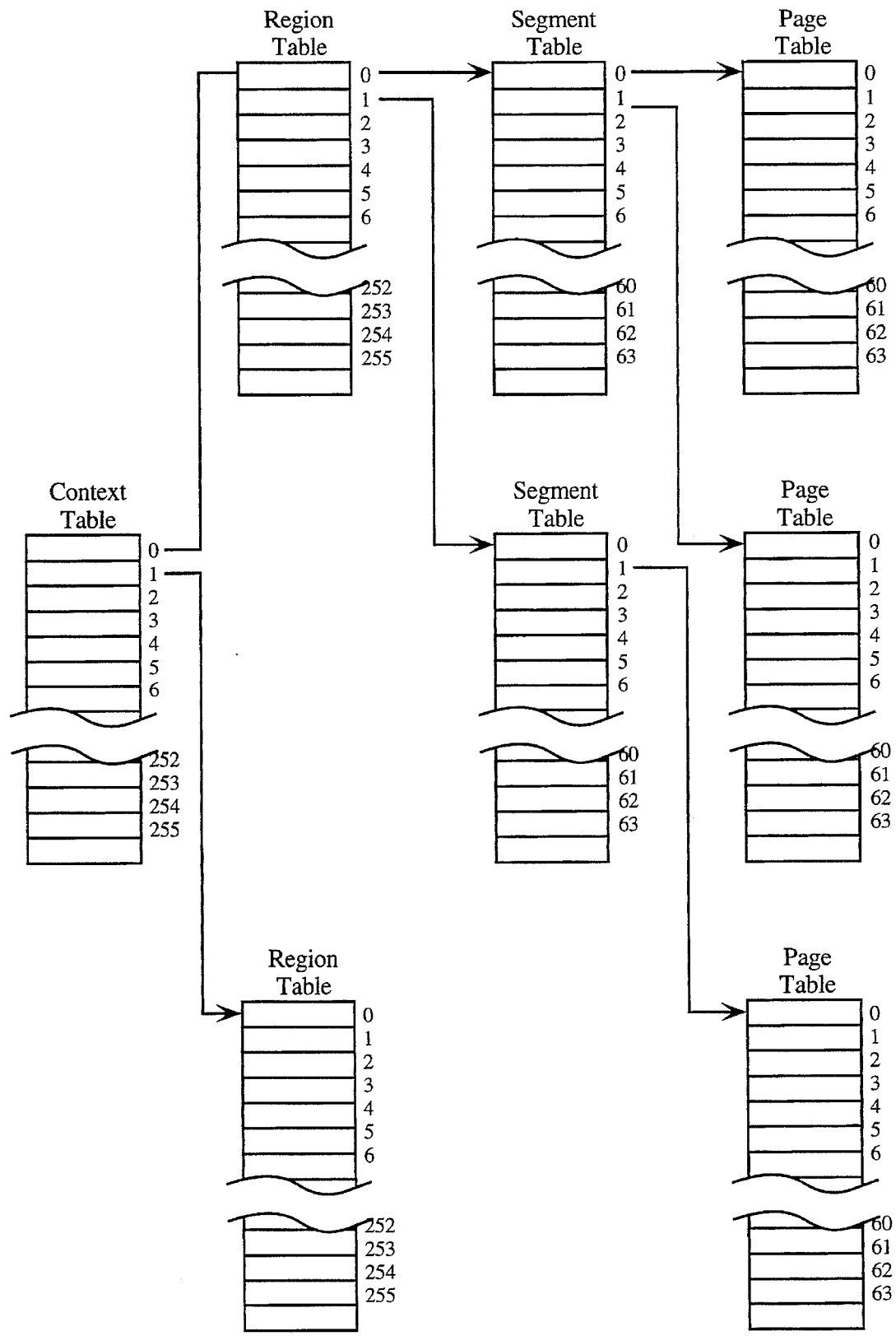
FIG. 4 shows four levels of tables employed by a memory management system.
Figure 5:
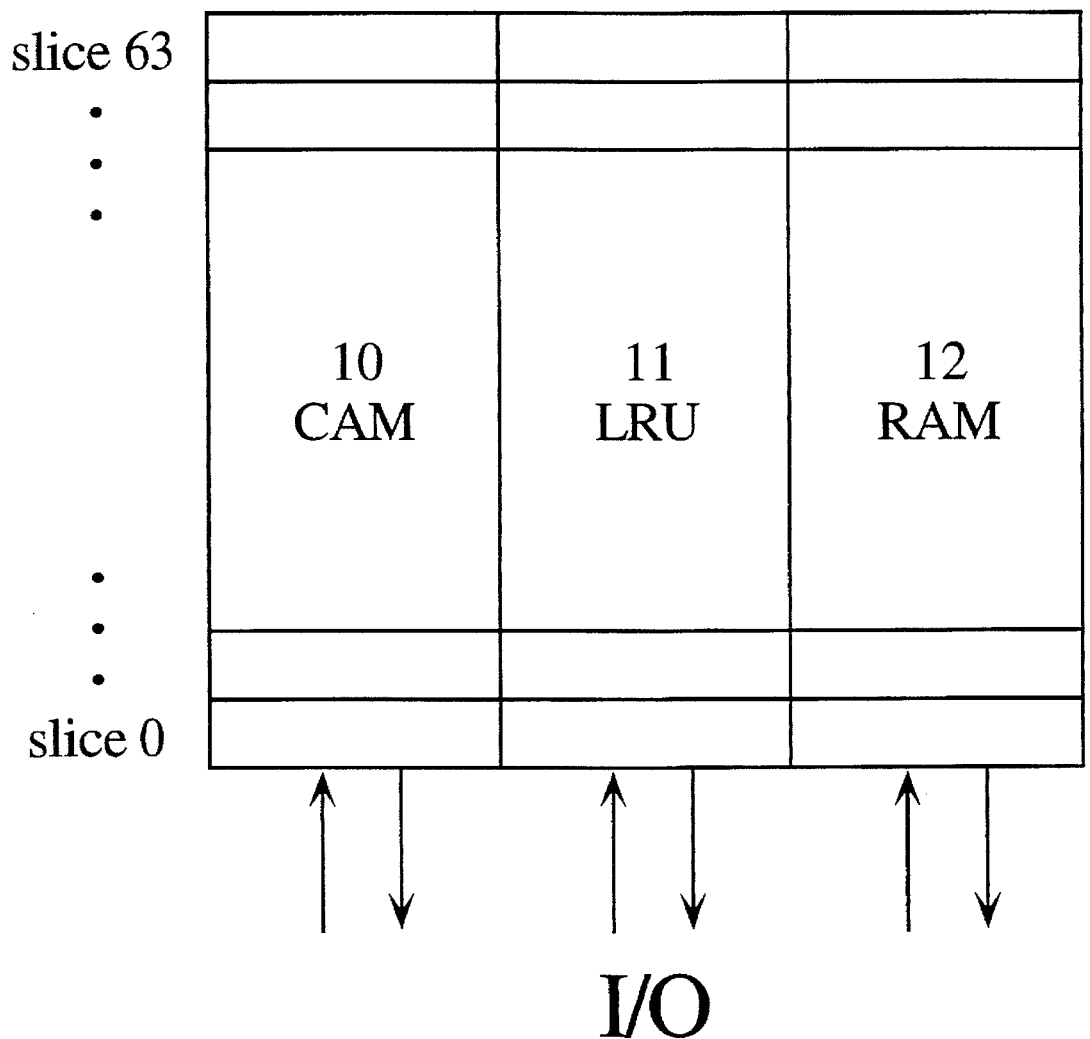
FIG. 5 shows a diagram representative of an interior portion of a translation lookaside buffer.

Referring to FIG. 5, a diagram is shown which is representative of an interior portion of a translation lookaside buffer (TLB) according to the invention. The TLB includes a CAM (content addressable memory) column 10, a LRU (least recently used) column 11, and a RAM (random access memory) column 12. In this embodiment, CAM column 10 comprises sixty-four storage locations, each twenty-eight bits wide, for storing virtual page addresses and contexts. Similarly, RAM column 12 comprises sixty-four storage locations, each thirty-two bits wide, for storing physical page addresses and additional information corresponding to the virtual page numbers stored in CAM column 10. LRU column 11 comprises sixty-four ripple counters, each six bits wide, which are used to control the replacement of the translation entries stored in the CAM and RAM columns.

The specific embodiment of the invention disclosed is incorporated in a system having a structure as shown in FIG. 5. It should be noted, however, that the invention is applicable to systems having other structures. For example, the invention is applicable to a system having an X-bit wide CAM column, a Y-bit wide LRU column, and a Z-bit wide RAM column.

In addition, although the term "column" is used to describe the CAM, LRU, and RAM portion of the TLB, other configurations may be used without departing from the scope of the invention. For example, each CAM, LRU, and RAM portions may be arranged as a row. It should also be noted that the CAM and RAM portions may not necessarily be arranged as contiguous memory.

Each row formed by the adjacent CAM, RAM and LRU columns of FIG. 5 is referred to as a "slice". A "valid bit" is associated with each slice. Each slice further includes a virtual page number storage location in CAM column 10, a corresponding physical page number storage location in RAM column 12, and an associated value within the LRU counter of that slice. When the MMU (memory management unit) receives a virtual page number, the bits are provided to the TLB and compared to the virtual page number entries stored within each of the sixty-four locations in the CAM column.

The valid bit of each slice indicates whether the corresponding slice contains a valid virtual to physical translation entry. A valid virtual to physical translation entry is a translation entry which corresponds to an active process executing within the computer system. At initial operation of the TLB, each valid bit is reset, which indicates that none of the slices contain valid translation entries. As memory is accessed by the machine and the MMU performs table walking, translation entries are one by one stored in the empty slices of the TLB. When a translation entry is loaded into a slice, the associated valid bit for that slice is set. When each of the sixty-four translation slices contain valid translation entries, new translation entries are stored in the TLB using a least recently used algorithm as explained below.

If a "miss" occurs, the MMU performs a table walk to obtain the physical page number from the translation tables in main memory and loads the resulting physical page number into one slice of the TLB. The TLB employs the least recently used replacement algorithm for determining the particular slice into which the new translation entry is loaded. In implementing the least recently used algorithm, each slice containing a valid translation entry includes a value stored in the LRU counter from 0 to 63 which is indicative of the time during which the translation entry within the particular slice was accessed relative to each of the other slices. As such, when a miss occurs, the new physical page number loaded from the tables in main memory is stored (with its corresponding virtual page number) in a slice which does not yet have a valid translation entry loaded or which has the value 63 stored in its LRU column. The LRU entry of that slice is next reset to 0, and each LRU value stored in the other slices is incremented by one. Thus, the LRU column stores a "time stamp" for each translation entry which is indicative of the time at which the slice was last used relative to the time at which the other slices were used. The least recently used algorithm is explained in more detail below.

If a "hit" occurs (when the TLB contains the virtual page number to be translated), the physical page number stored in the slice corresponding to that virtual page number is provided at an output bus. The LRU counter of that slice is consequently reset to 0. Before the LRU counter is reset, however, the LRU counter of each of the other slices having a value which is less than the counter value of the hit slice is incremented. The slices having LRU values greater than the counter value of the hit slice remain unchanged. Therefore, the time at which each slice is used relative to the use of the other slices is indicated by the LRU counter values.

Figure 6:
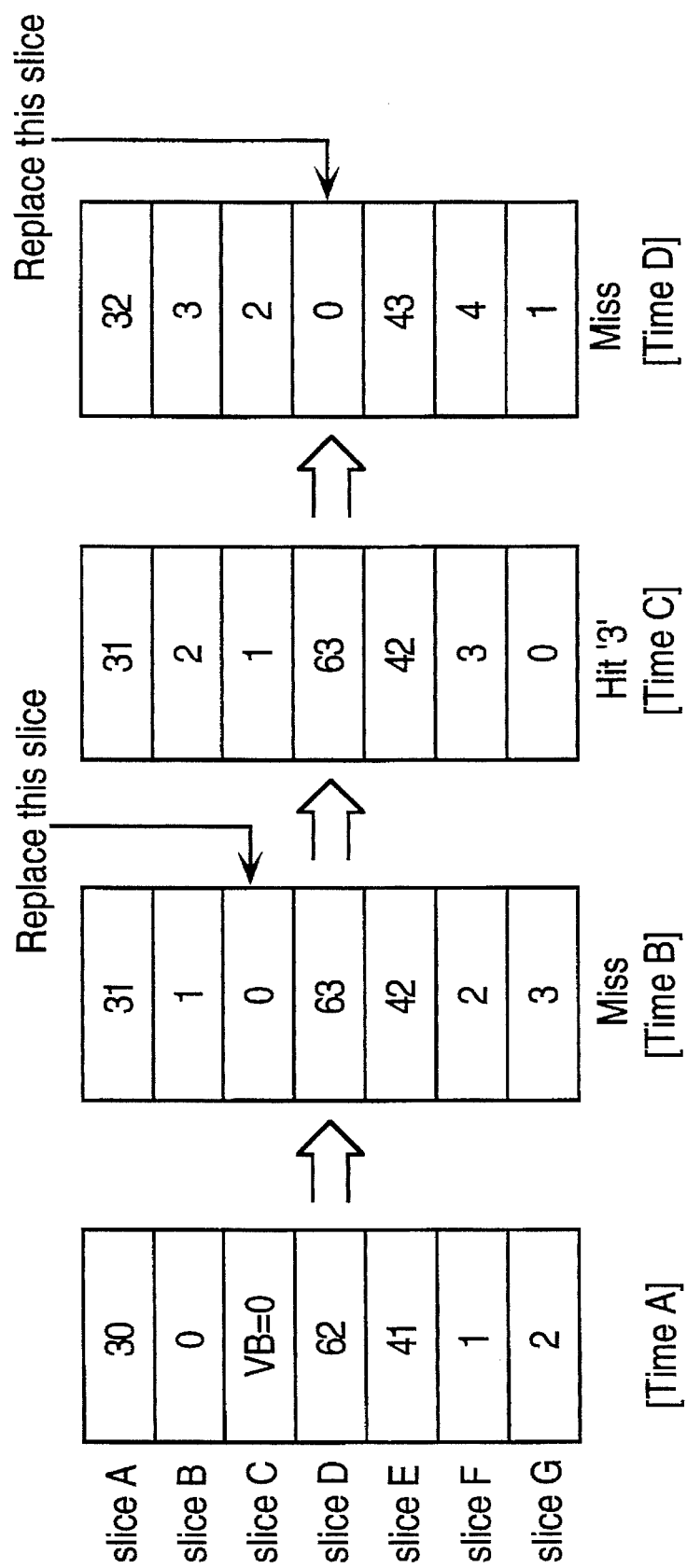
FIG. 6 shows an example of the least recently used replacement algorithm.

FIG. 6 illustrates an example of this replacement algorithm and the values stored within several selected slices of the LRU column before and after each of three translation-fetch cycles. The same LRU slices (arbitrarily labeled Slice A through Slice G) are shown for each of the times A–D.

At a Time A after several table walking cycles have been initiated, the LRU column for the selected Slices A–G contains the values as indicated (arbitrarily chosen for exemplary purposes). Slice C is shown initially having its valid bit reset, indicating that it does not contain a valid translation entry in its CAM and RAM columns.

At Time B, after a TLB miss and after the MMU has initiated a table walk, a new translation entry is stored within the CAM and RAM locations of Slice C. The LRU counter value of Slice C is set to zero, the valid bit is set, and each of the LRU counter values in the other slices is incremented by one. Hence, the LRU counter values indicate that Slice C is the most recently used translation in the TLB, that Slice D is the least recently used translation in the TLB, and so on.

At Time C and after a hit occurs for the translation contained in Slice G, the LRU counter value stored in Slice G is set to zero, and each of the LRU counters in the other slices which had values less than 3 are incremented by one. The slices having LRU counter values which are greater than 3 remain unchanged.

Finally, at Time D and after a TLB miss, the MMU initiates a table walk to obtain the desired translation entry from the tables in main memory. Since Slice D has the oldest translation entry (as indicated by the value 63 in its LRU counter at Time C), it receives the new translation entry. The LRU counter of Slice D is correspondingly set to 0, and each LRU counter of the other slices is incremented by one. Updating of the LRU counters occurs after a valid translation entry is obtained to maximize the integrity of the counter values in the case of memory failure.

Each slice includes a twenty-eight bit address comparator which is used to compare the twenty-bit virtual page number transmitted from the MMU and an eight-bit context value from a context register to the entry in the corresponding CAM location of that slice. The current context value and the virtual page number are compared to the CAM entry simultaneously such that the current context value is compared to the high order eight bits of each CAM entry while the virtual page number is compared to the low-order twenty bits of each CAM entry. When a virtual page number is received by the TLB, the virtual page number and the current value of the context register is compared to the CAM entry of each slice having its associated valid bit set.

Selected bits of the virtual page number may, however, be masked. There are several situations where masking may be desirable. As an example, masking is desirable when an entire process is terminated. When an entire process is terminated, all translation entries within the TLB corresponding to the process can be invalidated during a single comparison operation by masking selected bits of the CAM entries and comparing only the higher order bits which correspond to that process and then deleting from the TLB in one operation the translation entries so identified. Time is thus saved since a comparison operation need not be performed separately for each translation entry. This operation, a flushing operation, is explained further below.

Masking is also desirable if the TLB controls a plurality of processes having differently sized pages. If a first process has a larger page size than another process, then it is desirable to mask a greater number of the lower bits when comparing virtual addresses corresponding to the first process. For example, if a first process utilizes pages each having an 8K capacity while the other processes utilize pages each having only a 4K capacity, an additional bit is masked when the TLB determines whether a hit occurs for the first process.

If the context value and a virtual page number or selected unmasked bits of the virtual page number exactly match the corresponding unmasked bits of a CAM entry, a hit occurs. The TLB consequently provides the physical page number stored in the RAM column of that slice to an output bus.

When a virtual page number to be translated is sent to the TLB and is compared as explained above, the MMU simultaneously initiates the table walking procedure to obtain the translation entry from the tables in main memory. If a hit occurs, the TLB provides a "global hit" output signal which causes the table walking procedure to abort. In addition, after a hit occurs, the LRU counter for each slice is updated if necessary.

When a miss occurs, the global hit output signal is not provided by the TLB and the table walking procedure is not aborted. Instead, the table walking procedure continues and, when completed, provides the desired translation entry (physical page number) from the tables in main memory. Since the comparison operation of the TLB occurs simultaneously with the initiation of the table walking procedure, additional time in not expended while checking for the virtual page number within the TLB. After the translation entry is obtained using the table walking procedure, the translation entry is loaded into a slice of the TLB having its valid bit reset or into a slice in accordance with the least recently used algorithm (if all valid bits are set). The LRU counter for each slice is consequently updated.

It is critical for the TLB to perform its operations quickly. In accordance with the invention, the time required for the TLB to perform the comparison and LRU counter updating is minimized by a "pipelining" technique. Each slice has an associated six-bit LRU comparator which compares the LRU counter value of that slice to a value on a reference bus. When a translation entry is loaded into the CAM and RAM columns of a particular slice in accordance with the least recently used algorithm, the value of the LRU counter in that slice is broadcast on the reference bus. Each of the LRU comparators associated with the other slices accordingly compares the value on that reference bus to the value of its associated LRU counter and causes the LRU counter to either increment or not, depending upon whether the counter value is greater than or less than the value on the reference bus. Since each LRU counter is a ripple counter, the pipelining technique allows the lower order bits of each LRU counter to be compared to the value on the reference bus at the same time when the higher order bits of the LRU counter are still incrementing. As a result of this pipelining technique, the overall time required to update the LRU counters and make consecutive comparisons is reduced, and hence the translation time of the TLB is decreased when translation entries within the TLB are respectively accessed.

Other benefits of using a ripple counter to implement the function of each LRU counter are attained in addition to supporting operation of the pipelining technique. Since ripple counters are incorporated in the design rather than synchronous counters, an optimized circuit layout can be designed and thus much less chip area is required. An optimized circuit layout is achieved since ripple counters require fewer interconnecting lines (i.e., input lines and output lines) than do synchronous counters. A reduction in the number of interconnecting lines allows a corresponding reduction in required layout area on the semiconductor chip incorporating the circuitry used with this invention.

Occasionally, for example when an entire process or wide address range is terminated, several of the translation entries in the TLB may be invalidated by resetting their associated valid bits. Resetting of the valid bits is accomplished through a parallel flushing algorithm wherein the high order virtual address bits corresponding to the range of addresses to be invalidated are broadcast on a bus to each slice of the TLB. The associated valid bit of each TLB slice which is hit is correspondingly reset. New translation entries are thereafter stored within the invalidated slices. The flushing algorithm is supported by a level decoding circuit as explained below and by software.

Figure 7:
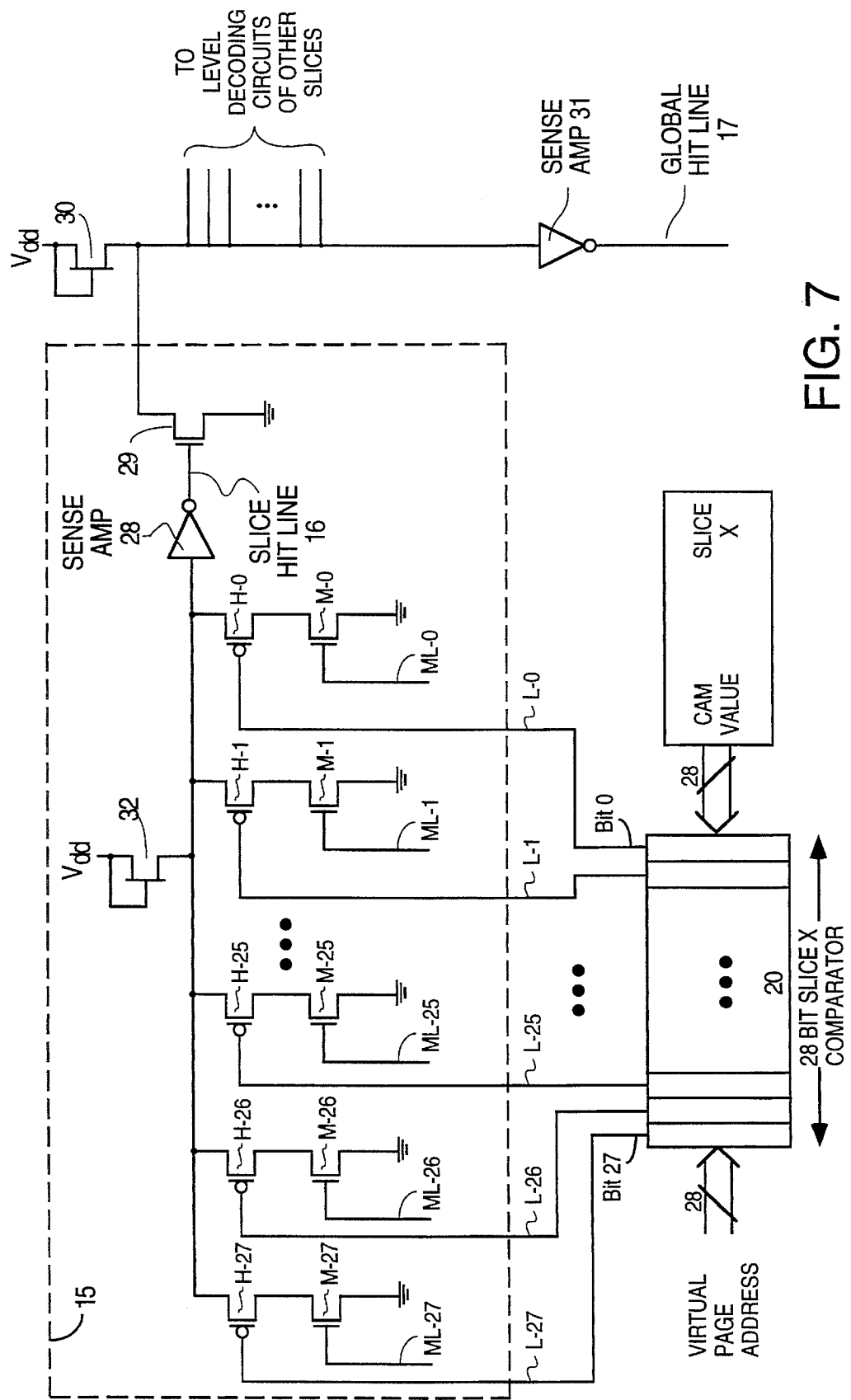
FIG. 7 shows a level decoding circuit in accordance with the invention.

FIG. 7 shows a level decoding circuit 15 connected to one slice (arbitrarily labelled Slice X) of the TLB. Level decoding circuit 15 is provided to indicate a hit or miss within the TLB. A separate level decoding circuit 15 as shown is similarly connected to each of the other sixty-three slices. Hence, there are sixty-four level decoding circuits within the TLB. Level decoding circuit 15 allows efficient operation of the TLB when a virtual address must be translated and when certain translation entries or sets of translation entries must be invalidated. Level decoding circuit 15 also supports the ability to use variable sized pages as described above. These advantages are achieved as a result of the masking capability supported by level decoding circuit 15.

Level decoding circuit 15 generates a slice hit signal at an output line labelled SLICE HIT LINE 16. SLICE HIT LINE 16 is connected to a sense amplifier 28 and to an N-channel MOSFET 29. MOSFET 29 is connected to an N-channel MOSFET 30 and to a sense amplifier 31. The output line of sense amplifier 31 is labeled GLOBAL HIT LINE 17.

A twenty-eight bit comparator circuit 20 compares each bit of the virtual page address stored in the CAM column of Slice X to a virtual page address received from the MMU to be translated. Comparator 20 provides twenty-eight output lines L-0 through L-27, and each of the comparator output lines is connected to a gate of a P-channel MOSFET H-0 through H-27 within level decoding circuit 15. MOSFETs H-0 through H-27 are referred to as "hit" transistors. Each gate of MOSFETs H-0 through H-27 is represented with an open circle.

Each of the hit transistors H-0 through H-27 is connected in series with an N-channel MOSFET M-0 through M-27. Each MOSFET M-0 through M-27 has a gate connected to a bit masking line. The bit masking lines are connected to the RAM and CAM columns, as explained below. MOSFETs M-0 through M-27 are referred to as "masking" transistors.

Each series hit transistor H-i and masking transistor M-i combination is controlled by a corresponding output line L-i of comparator 20 where i is an integer given by $0 \leq i \leq 27$. When both the hit and masking transistors H-i and M-i corresponding to a particular comparator output line L-i are in their conductive states, slice hit line 16 goes HIGH. Each of the p-channel hit transistors H-0 through H-27 is in a conductive state when its gate is low, which occurs when the particular bit of the virtual address does not match the corresponding bit of the CAM value within that slice. If the mask bit line ML-i connected to the gate of one of masking transistors M-i is HIGH, slice hit line 16 goes HIGH provided that the corresponding series hit transistor H-i is also on. This corresponding hit transistor is on when no match occurs in comparator 20 between the corresponding bits in CAM-10 and in the virtual page address. In response, global hit line 17 at the output of sense amplifier 31 goes HIGH. Each of the mask bit lines ML-0 through ML-27 is connected to the CAM section as explained below.

It is evident that slice hit line 16 goes LOW and thus global hit line 17 goes LOW when each unmasked bit of the virtual page address match the virtual page address stored in the CAM column. That is, slice hit line 16 goes HIGH only when both a masking transistor M-i and a corresponding series hit transistor H-i are on. Therefore, the state (on or off) of a hit transistor H-i does not control the state of slice hit line 16 if the corresponding series masking transistor M-i is turned off.

A pair of N-channel MOSFETs 30 and 32 are connected to a power source $V_{dd}$. N-channel MOSFETs 30 and 32 balance the speed of level decoding circuit 15; that is, MOSFETs 30 and 32 are used to ensure that the rise time of the circuit is approximately equal to the fall time.

Thus, level decoding circuit 15 provides a slice hit signal to indicate whether the CAM value within that slice matches unmasked bits of the virtual page address to be translated. Level decoding circuit 15 allows selected bits to be "masked" such that if the mask bit input line ML-i to the gate of a series masking transistor M-i is held LOW, the output of comparator 20 for the selected bit does not affect the signal on the slice hit line 16. The ability to mask selected bits of the CAM entries supports the table walking scheme and the use of variable page sizing as explained above.

Furthermore, a "flushing" algorithm is implemented within the TLB to invalidate a single translation entry, several translation entries or all translation entries within the TLB. If it is desired to invalidate a single translation entry at the command of the operating system or a programmer, the entire virtual page address is compared with each valid entry within the CAM column of the TLB. The level decoding circuit (in accordance with level decoding circuit 15) of each slice determines whether a match or hit occurs for one of the slices. If a hit occurs, the valid bit of that slice is reset.

When an entire process terminates, or when particular sections of a process terminate, it may be desirable to invalidate all translation entries corresponding to an entire context, region, or segment. The flushing algorithm of the TLB hence utilizes the level decoding circuitry associated with each slice to invalidate an entire set of translation entries efficiently. If an entire context must be invalidated, only the high order eight bits of each CAM location are compared. The lower order bits are masked and are thus "don't care" bits. A match occurring for the high order eight bits of any of the virtual translation entries in the TLB thus results in the resetting of the validation bits for those slices. Several translation entries within the TLB may hence be invalidated by comparing them to a single address. Initiation and control for flushing the TLB entries is performed by the MMU. Time is thus saved since the entries do not need to be invalidated on an individual basis. When all of the entries within the TLB must be invalidated, each valid bit is simply reset and no comparison operation is required.

Figure 8:
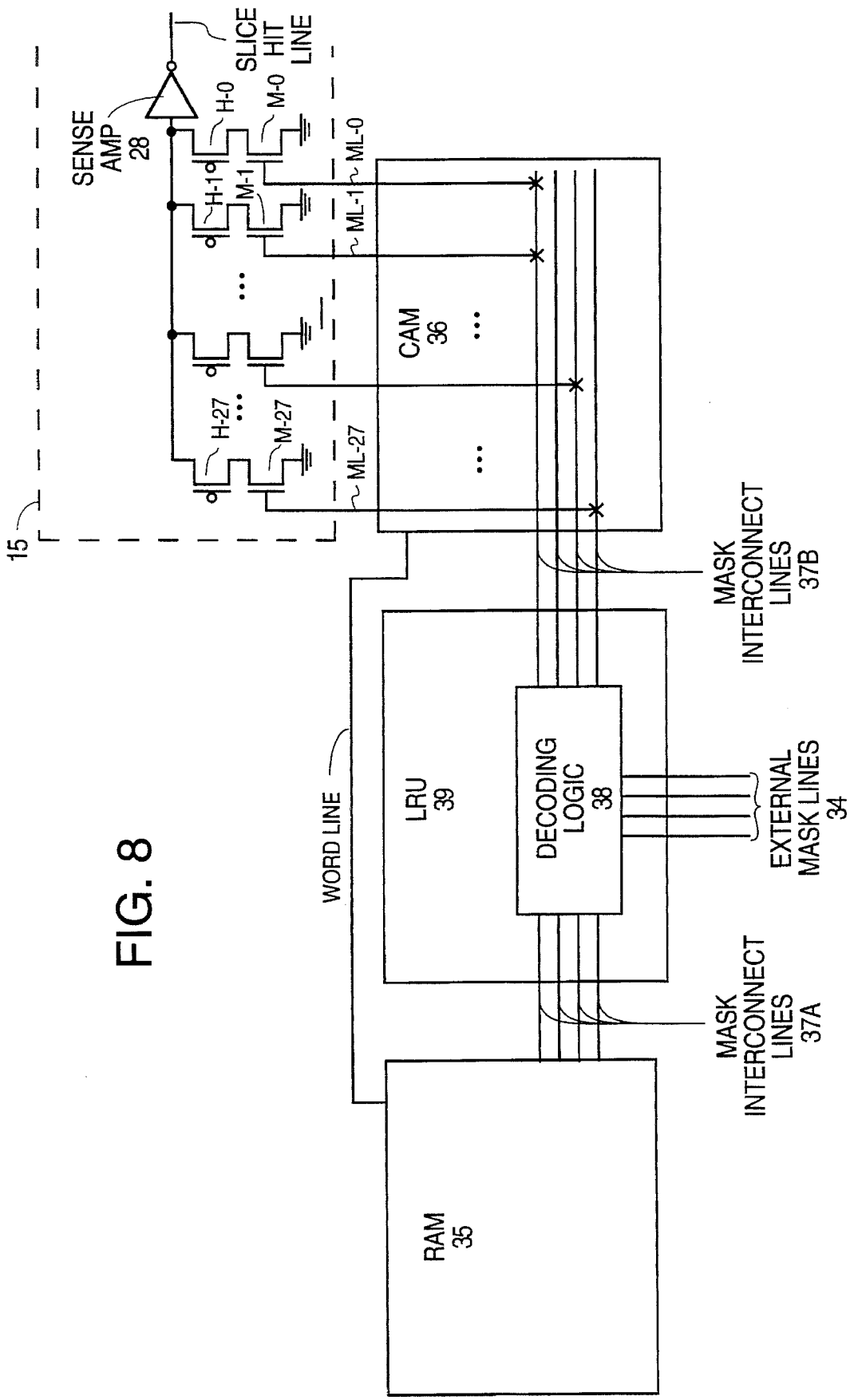
FIG. 8 shows a diagram of a portion of a slice within the TLB.

As mentioned earlier, the layout of the TLB is important for minimizing the overall required chip area. Several features of the invention allow for an optimized layout to minimize the required chip area. FIG. 8 shows a diagram representative of a portion of a slice within the TLB. A RAM section 35 and a CAM section 36 each have a plurality of mask interconnect lines 37A and 37B connecting to decoding logic 38 of an LRU section 39. Since each LRU section includes a ripple counter, an incrementor, and a comparator, the area required to fabricate each LRU section is large relative to the area required for each RAM and CAM section. Hence, the area of each LRU section is a controlling factor in the overall area required for the TLB. Since a ripple counter and comparator is incorporated within each LRU section rather than a synchronous counter and comparator, the size of each LRU section is reduced and fewer connecting lines are required. Furthermore, polysilicon interconnects are preferably used to allow a higher density of connections.

Mask interconnecting lines between each RAM, LRU and CAM section are arranged to further reduce the chip area required to fabricate the TLB. As described earlier in conjunction with FIG. 7, each level decoding circuit is connected to twenty-eight output lines L-0 through L-27 of a comparator 20, and to twenty-eight masking bit lines ML-0 through ML-27. Interconnecting lines labeled mask interconnect lines 37B as shown in FIG. 8 provide four levels of decoding by using four separate lines connected between decoding logic 38 and CAM section 36. Each of the masking transistors M-0 through M-27 of level decoding circuit 15 are connected to one of the mask interconnect lines 37B. The specific mask interconnecting line to which a particular masking line ML-i is connected is chosen to support the addressing scheme used within the TLB. Since in the disclosed embodiment four levels of tables are utilized (contexts, regions, segments, and pages), there are a total of four separate mask interconnect lines 37B. The size of each context, region, segment, and page therefore determines the particular mask interconnect line 37B to which a selected masking transistor M-i is connected.

It is clear that any number of mask interconnect lines 37B may be included without departing from the scope of the invention. Furthermore, the specific mask interconnect line 37B to which a selected masking transistor M-i is connected may be varied. During normal operation, bits stored within RAM section 35 control the logic levels on each of the four mask interconnect lines 37B and thereby control the masking of level decoding circuit 15.

During the flush mode, input signals on external mask lines 34 control the logic states of mask interconnect lines 37B, rather than bits stored in RAM section 35. If desired, the circuit can be easily modified such that the mask interconnect line 37B which controls a particular masking transistor is changed by connecting the base of that particular masking transistor to a different one of the mask interconnect lines 37B. For such a modification, it is not necessary to alter either the RAM section or the LRU section.

An additional line within each slice, labelled a word line, is connected from CAM section 36 to RAM section 35. The word line is used to control the loading of data into the CAM and RAM sections of the slice.

The TLB also has a testing mode for diagnostic purposes. The TLB allows software to read and write to each slice within the TLB, to test the TLB's comparator logic, and to test the LRU replacement logic. Test input lines allow external connection to the TLB and an address decoder provides a signal path to each of the slices with the TLB to accommodate the testing functions.

Figure 9:
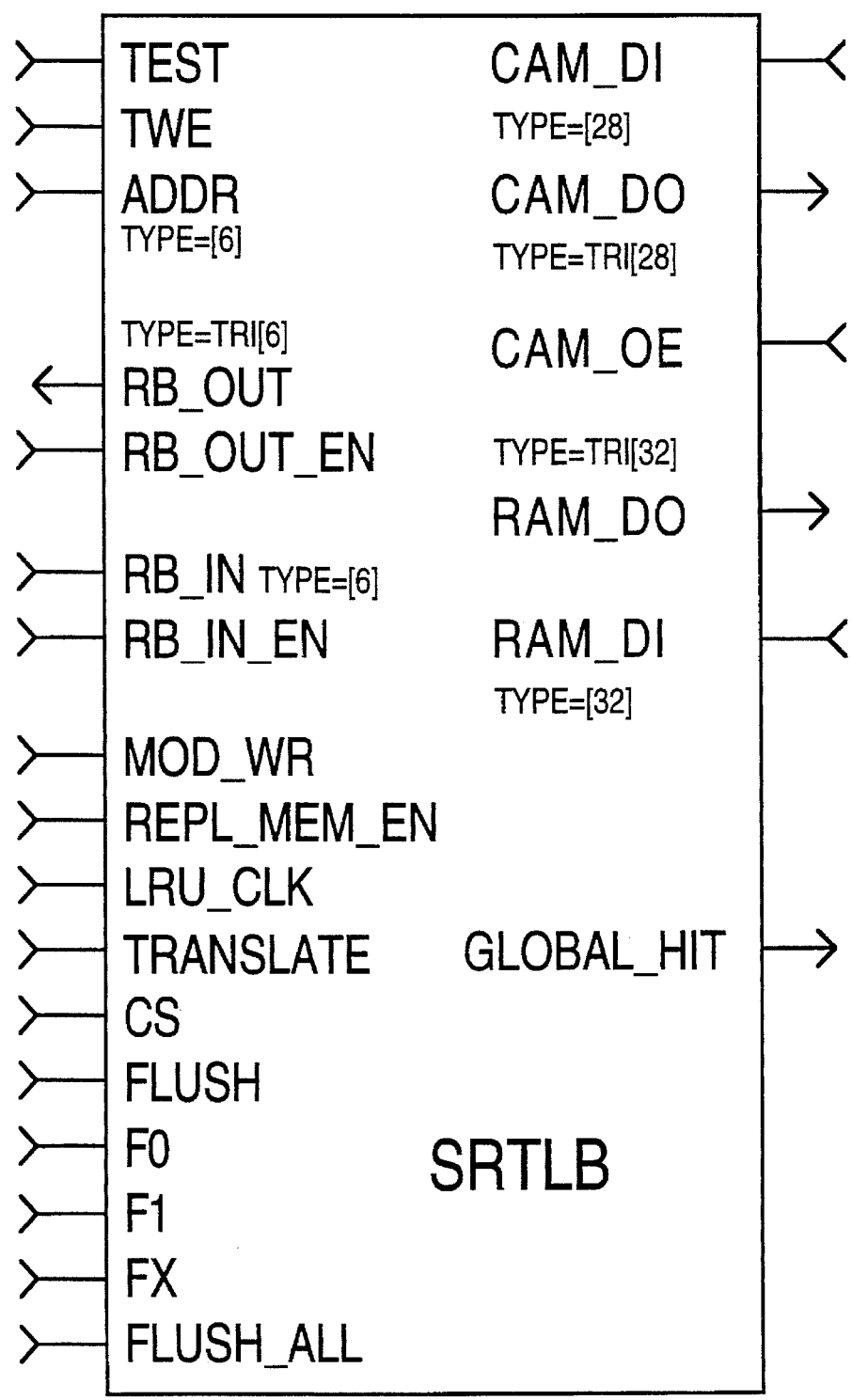
FIG. 9 shows an integrated circuit input/output diagram for a TLB according to a specific embodiment of the invention.

Referring next to FIGS. 9–14, portions of a functional model of an integrated circuit TLB in accordance with the invention are shown. FIG. 9 shows an input/output diagram of the integrated circuit TLB. Virtual page addresses and contexts are provided to and from the CAM column through buses CAM_DI and CAM_DO, respectively. The CAM_DI and CAM_DO buses are each 28 bits wide. The CAM_DO bus has tri-state output lines for connection to a data bus of a computer system to allow testing of the TLB and is enabled by an enable signal on the CAM_OE line. Similarly, physical page numbers (along with other information) are provided to and from the RAM column through buses RAM_DI and RAM_DO respectively. The RAM_DI and RAM_DO buses are each 32 bits wide. A global hit signal as explained earlier is provided at an output line GLOBAL_HIT.

Testing operations of the TLB may be performed using external test terminals. The ADDR bus is six bits wide and is used to select one of the 64 slices within the TLB for testing. If signals on the TEST and TWE lines are asserted, the test operation is in a writing mode. When a signal on the TEST line alone is asserted, the test operation is in a reading mode. The testing operations allow software to read and write each TLB entry, to test the TLB's comparator logic, and to test the LRU replacement logic.

The TLB also supports five flushing modes. The five modes allow software to specify the flushing of a single translation entry, of all translation entries in a segment, of all translation entries in a region, of all translation entries in a context, or every translation entry in the TLB. These flushing functions are performed with signals provided at the FLUSH, F0, F1, FX, and FLUSH-ALL lines.

A reference bus output port labelled RB_OUT is a port for a six bit reference bus which broadcasts the LRU counter value of a hit slice. In addition, during the flush state, a value of 0 is broadcast by the MMU on the reference bus to prevent the LRU counter values from changing. The RB_OUT port has an associated enabling line RB_OUT_EN.

An input port for the reference bus is labelled RB_IN. The RB_IN port is used on a slice miss to broadcast a value of sixty-three for updating the LRU counters. The RB_IN port has an associated enabling line RB_IN_EN.

A line labelled REPL_MEM_EN (replace memory entry) is used when a miss occurs and a translation entry is loaded from the tables in main memory. A line labelled MOD_WR is used to indicate to software that a page has been modified. A line labelled LRU_CLK is used to provide a clock signal for updating the counters. A TRANSLATE line enables the generation of the hit signal. Finally, a line labelled CS (chip select) is used for testing the dynamic current.

Figure 10A:
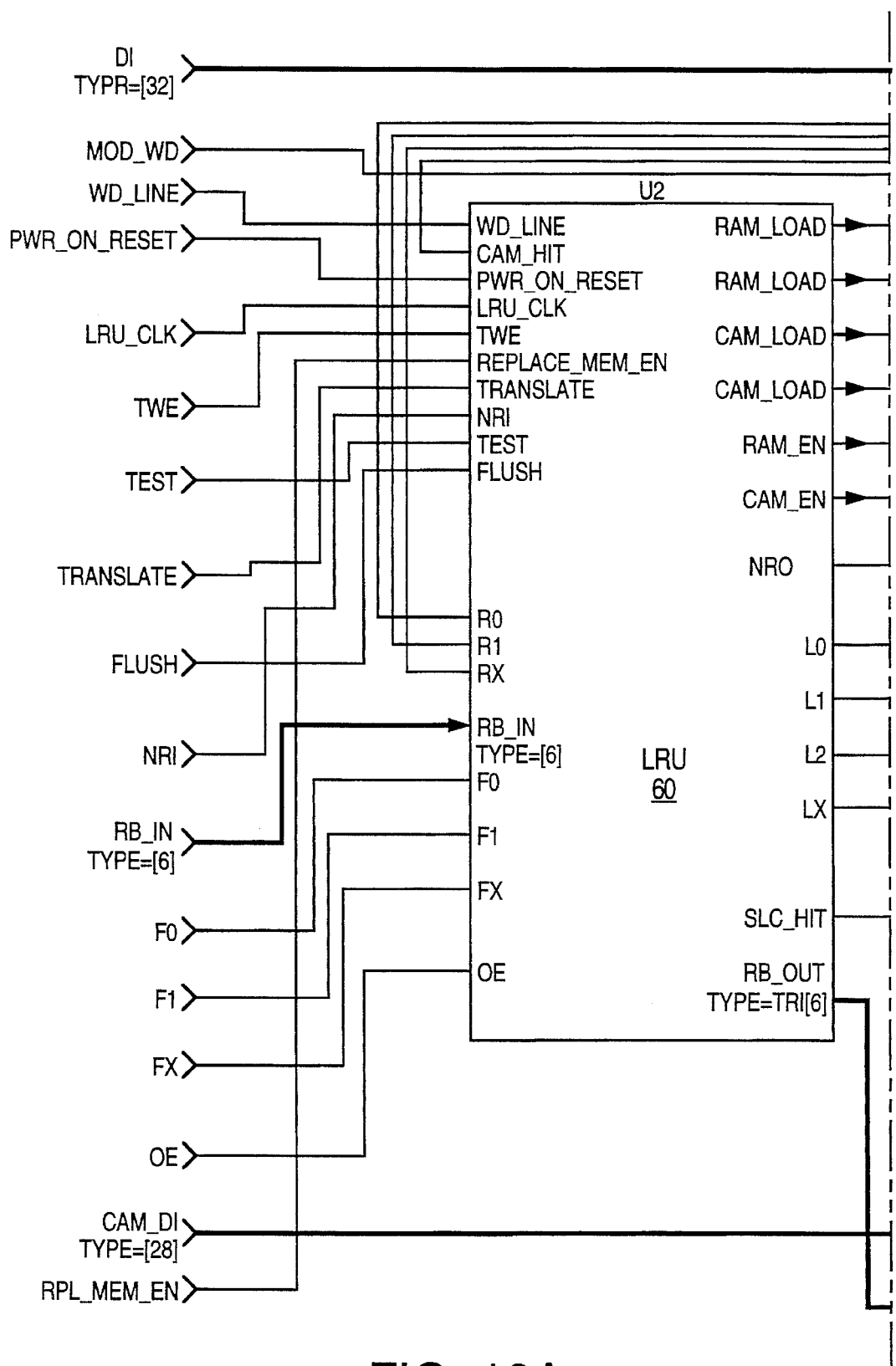
FIGS. 10(A)–10(B) show a block diagram of a slice within a specific embodiment of the TLB.
Figure 10B:
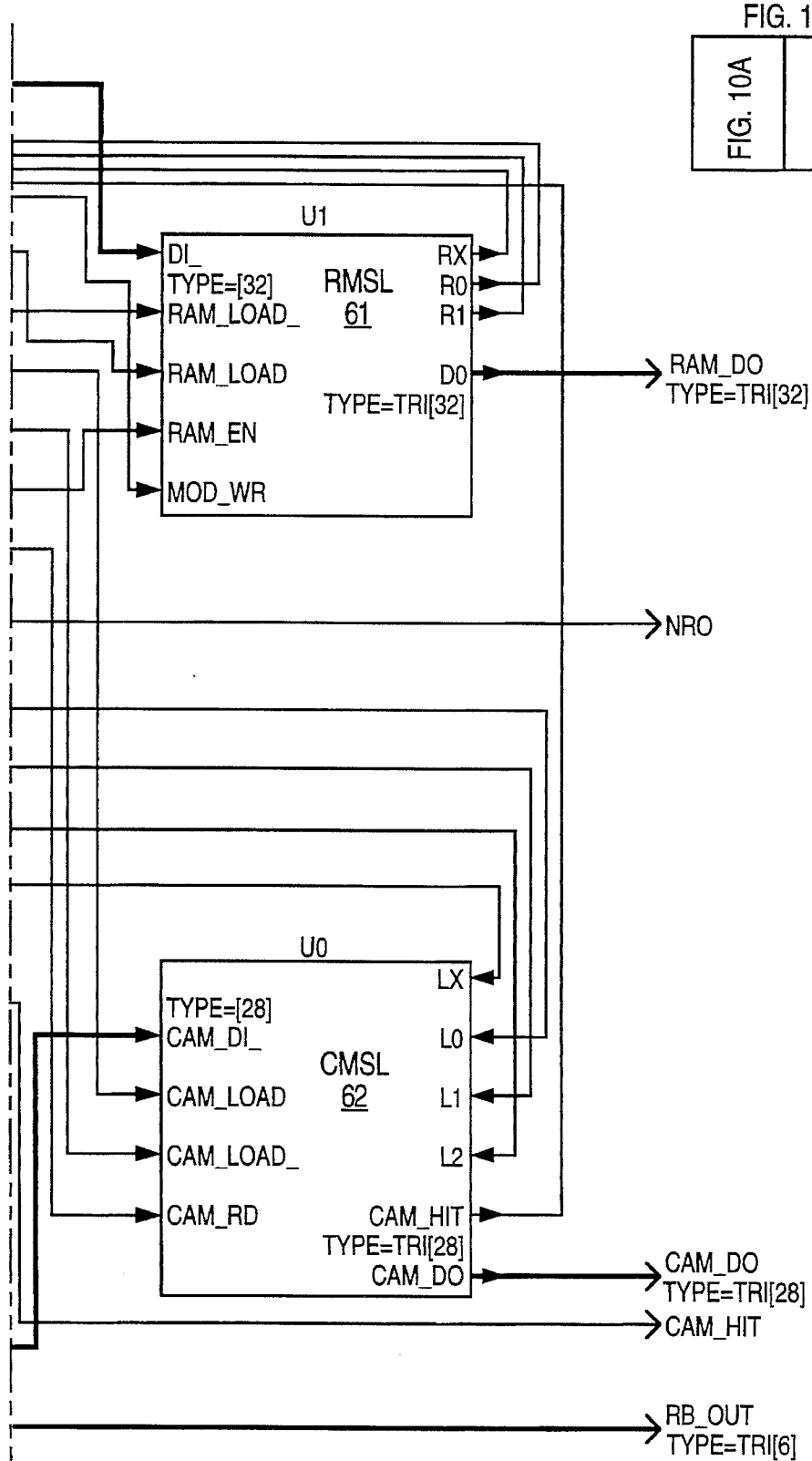
Figure 11A:
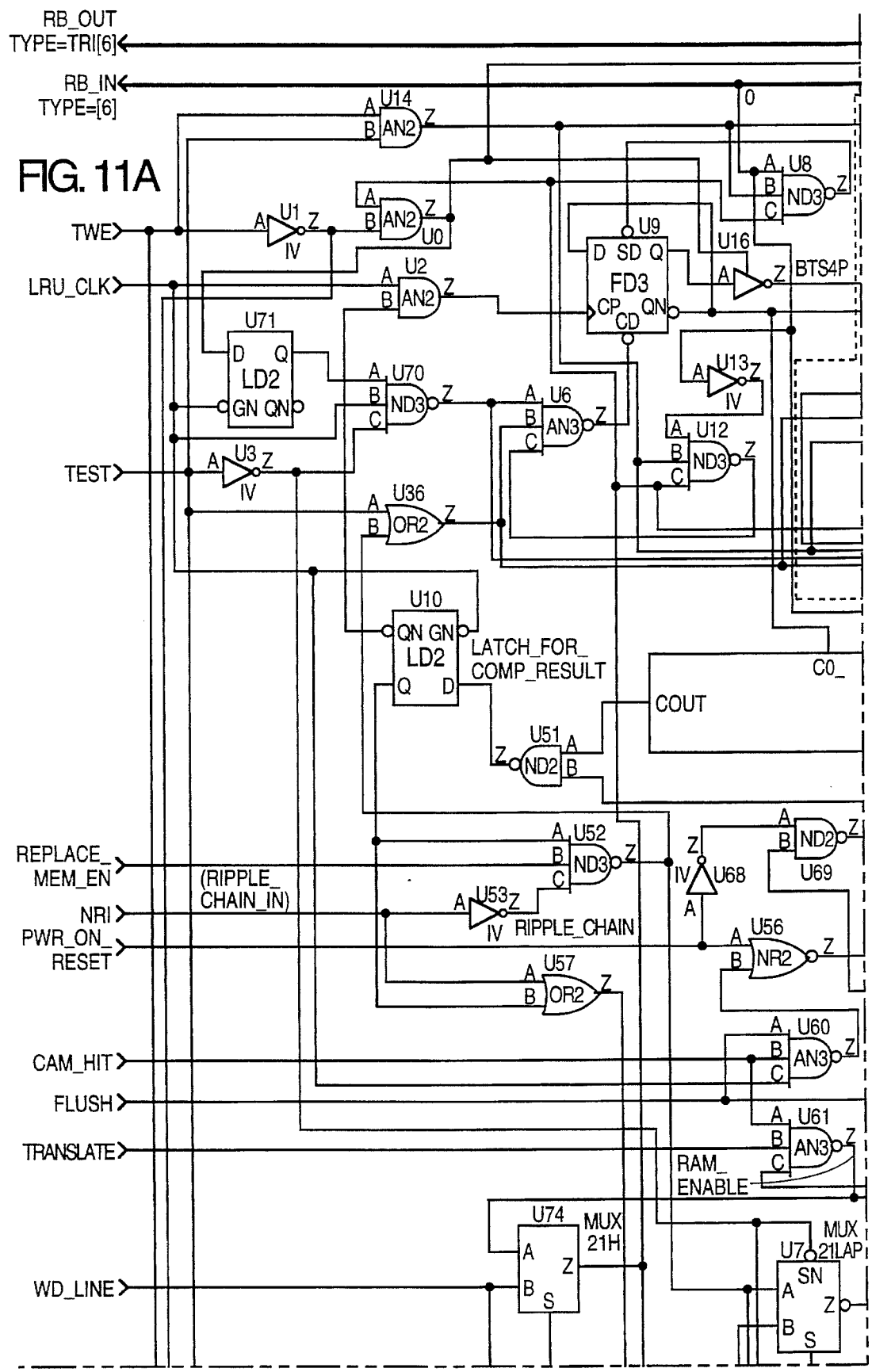
Figure 11C:
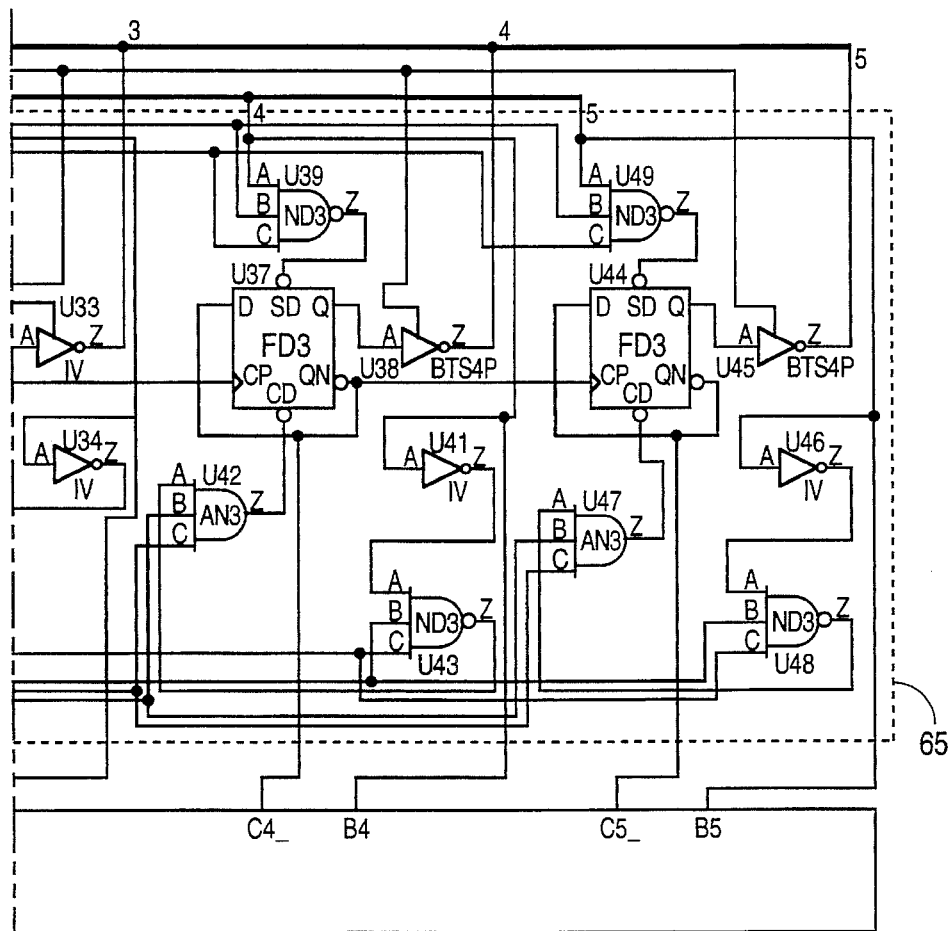
Figure 11D:
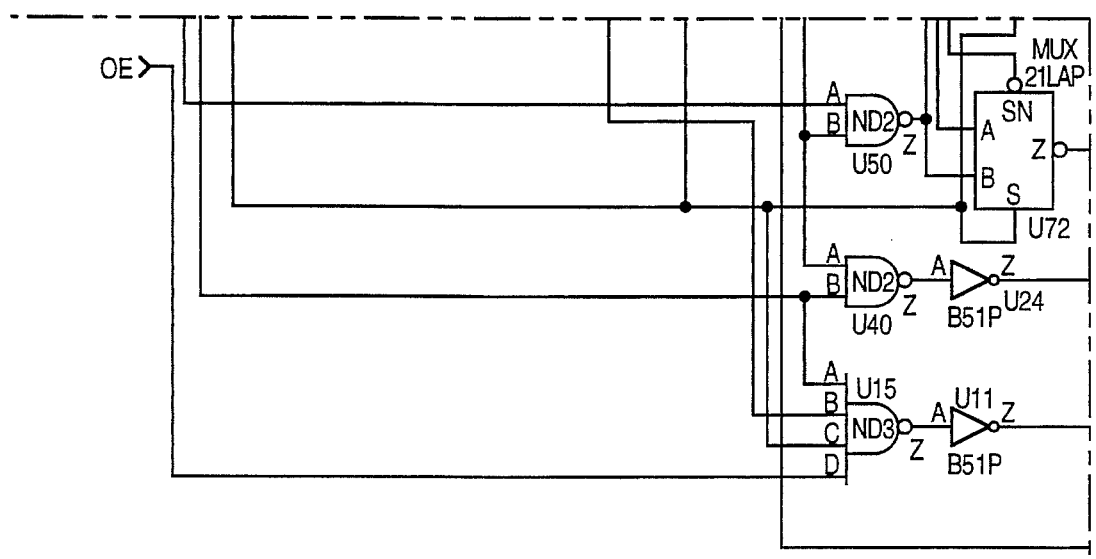
Figure 11E:
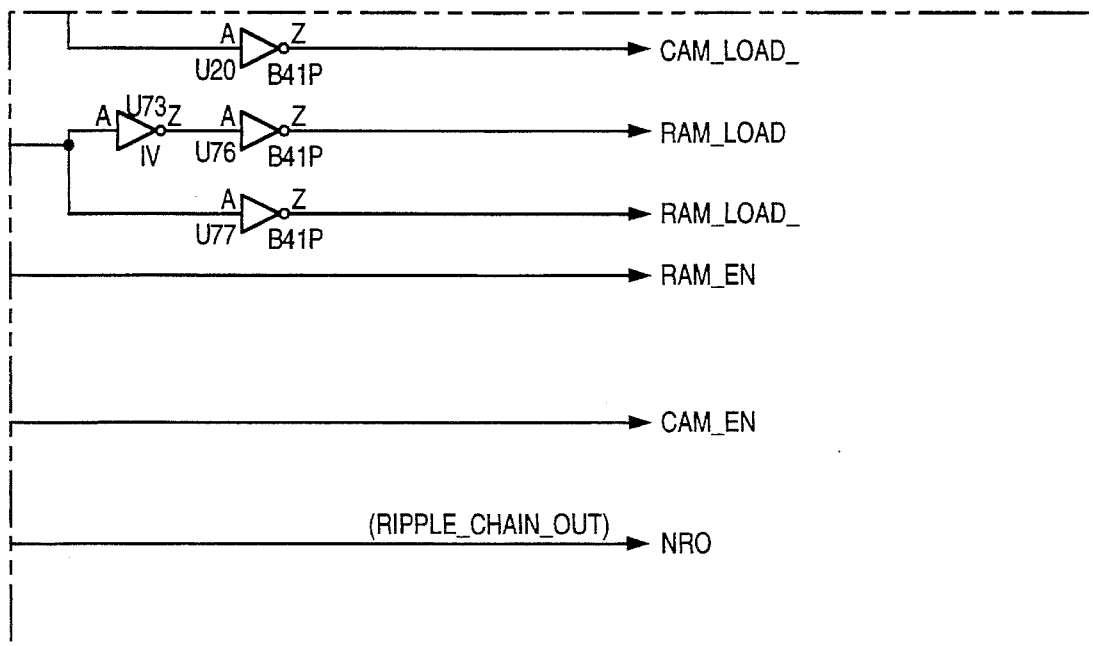

FIGS. 10(A)–10(B) show a block diagram of one slice within a specific embodiment of the TLB. In this embodiment, the TLB includes a total of sixty-four slices. The diagram shows input and output lines connected to an LRU portion of the slice 60, to a RAM portion of the slice (RMSL) 61, and to a CAM portion of the slice (CMSL) 62.

FIGS. 11(A)–11(E) show a functional model of LRU portion 60. LRU portion 60 includes a six-bit ripple counter 65, a comparator 66, and a level mask signal generator 67. The function of counter 65 and comparator 66 operates in accordance with the earlier description. Level mask signal generator 67 has four output lines L0, L1, L2, and LK which are connected to the masking transistors M-0 to M-27 as explained above.

Figure 12A:
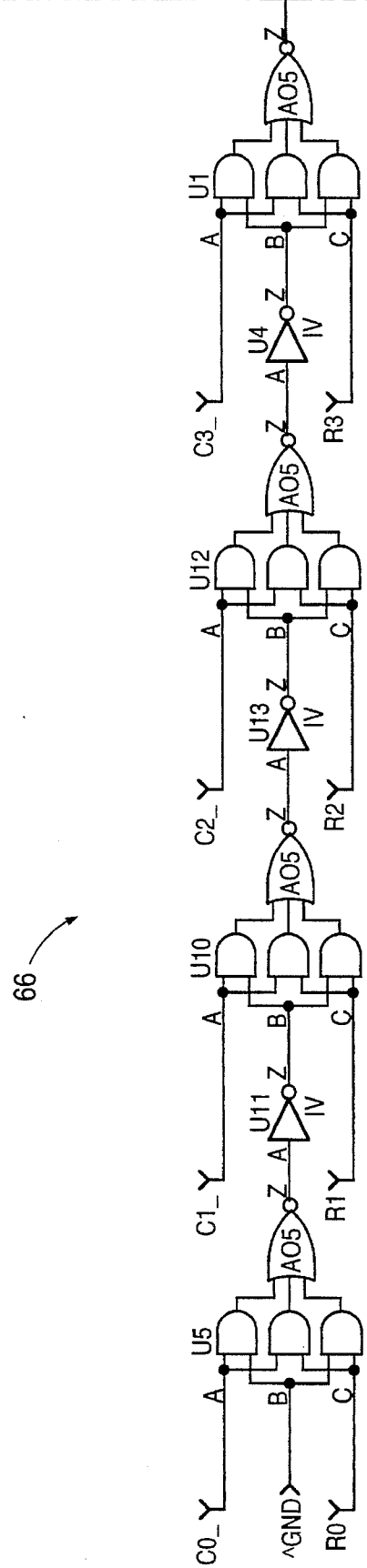

A functional model of comparator 66 is shown in FIGS. 12(A)–12(B). It is evident that comparator 66 is a ripple comparator in accordance with the earlier description.

Figure 13A:
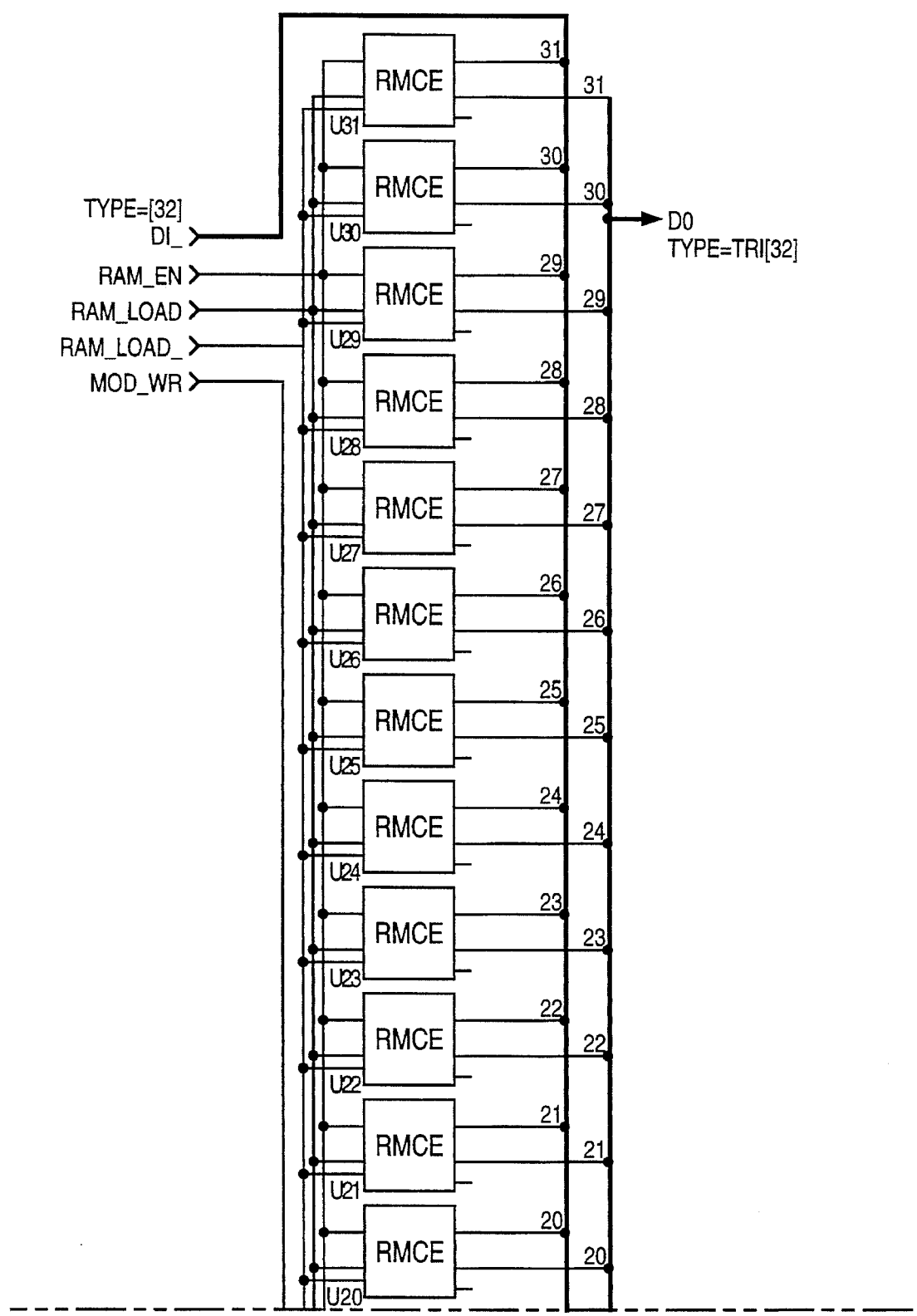
FIGS. 13(A)–13(C) show a functional model of a RAM portion within a slice of the TLB.
Figure 13B:
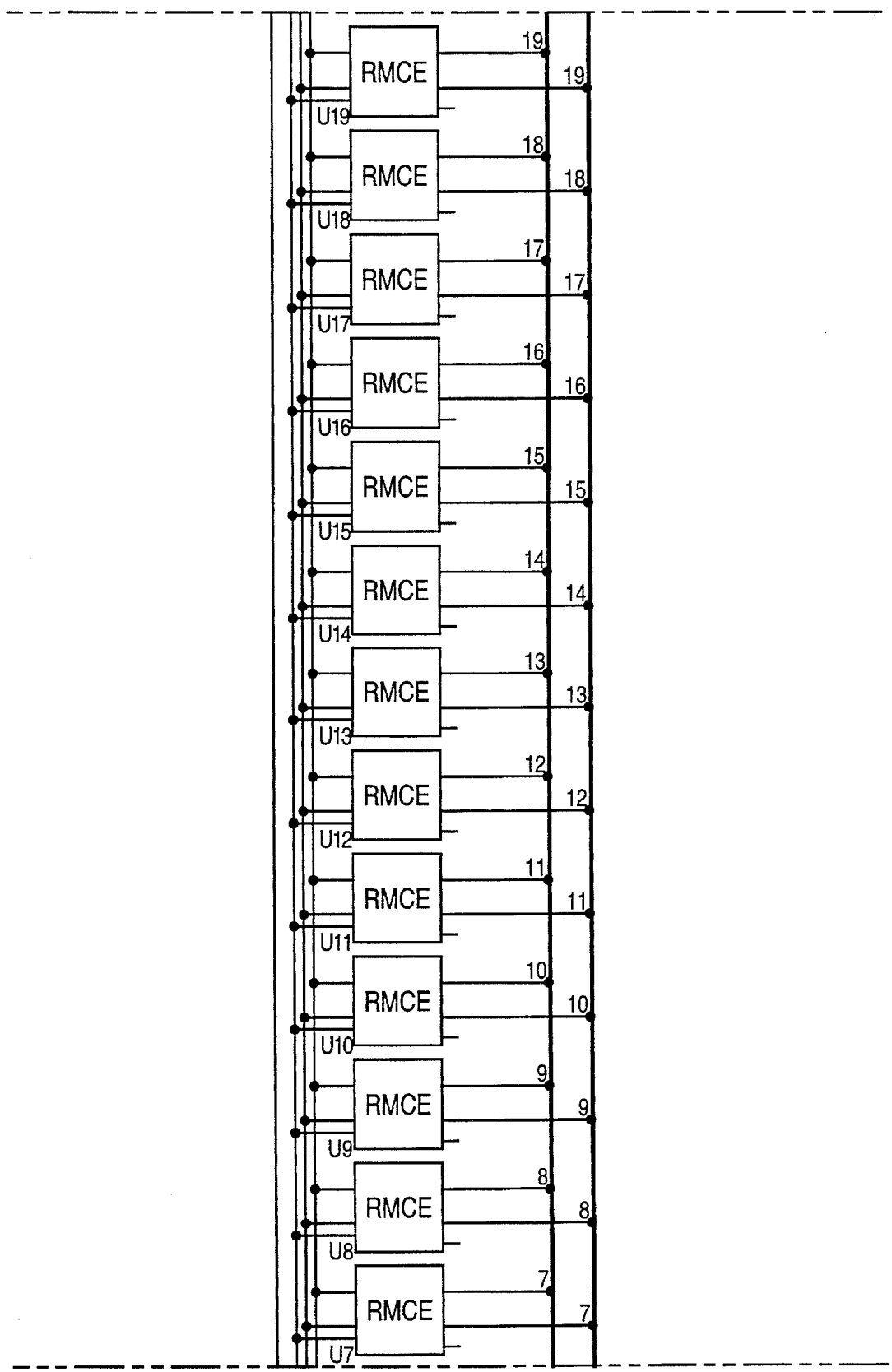
Figure 13C:
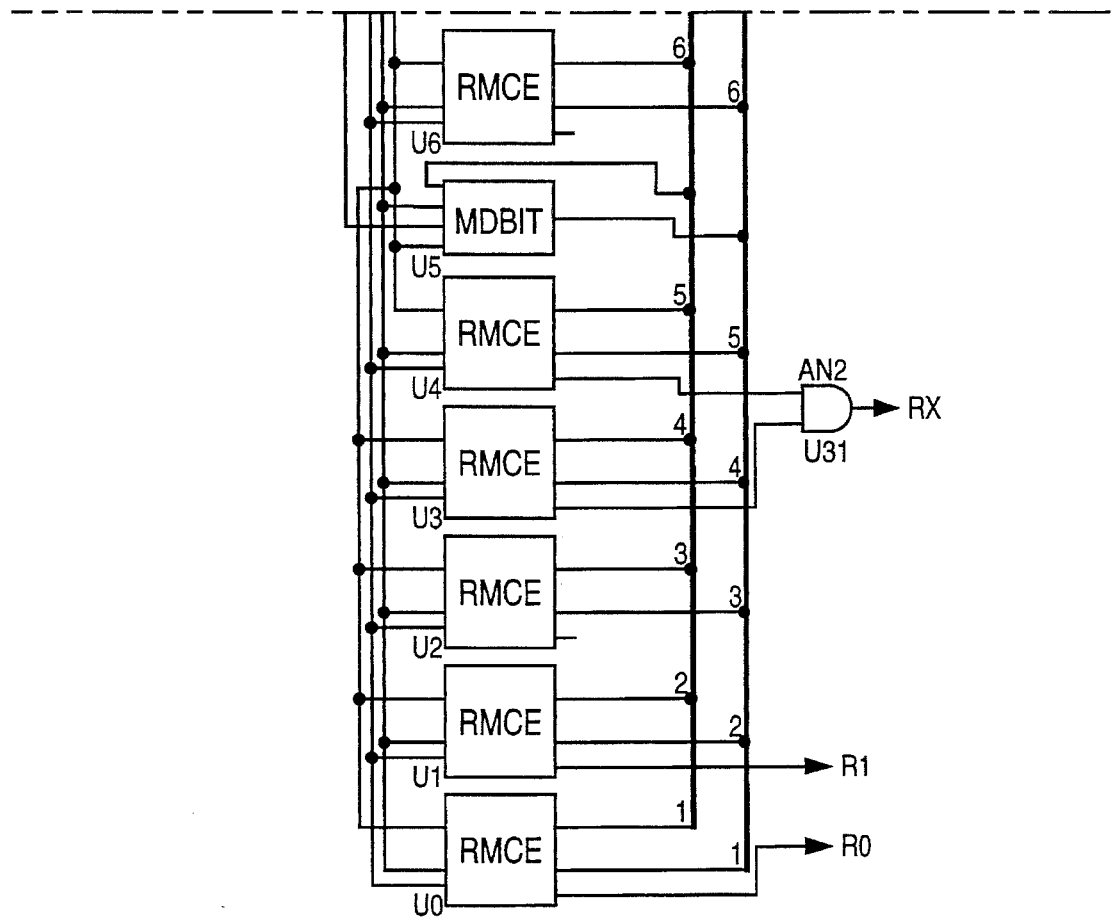

FIGS. 13(A)–13(C) show a functional model of a RAM portion RMSL 61. A plurality of latches labelled RMCE are included in RMSL 61. In accordance with the earlier description, RMSL 61 includes a thirty-two bit input bus and a thirty-two bit output bus.

Figure 14A:
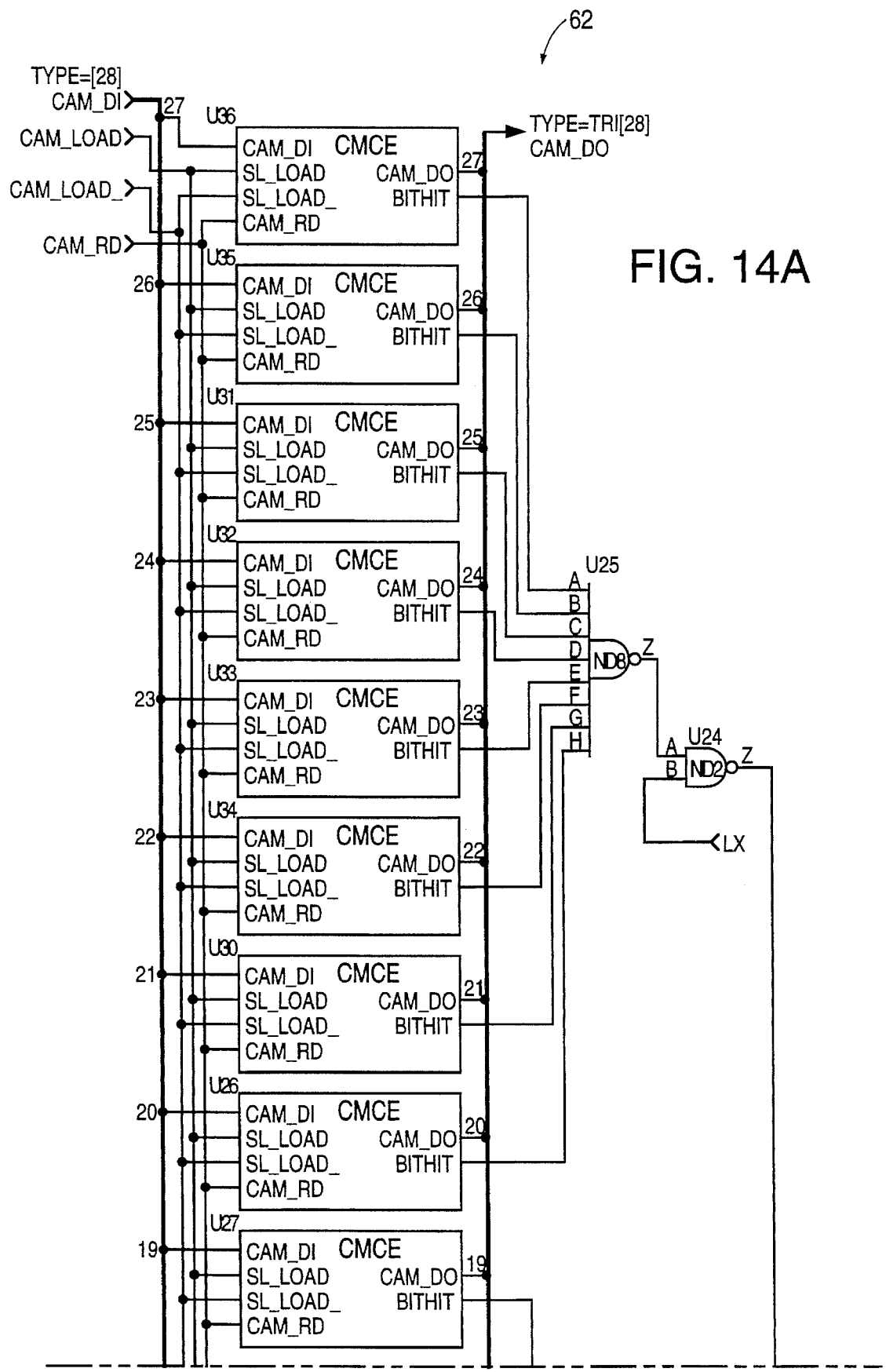
FIGS. 14(A)–14(C) show a functional model of a CAM portion within a slice of the TLB.
Figure 14B:
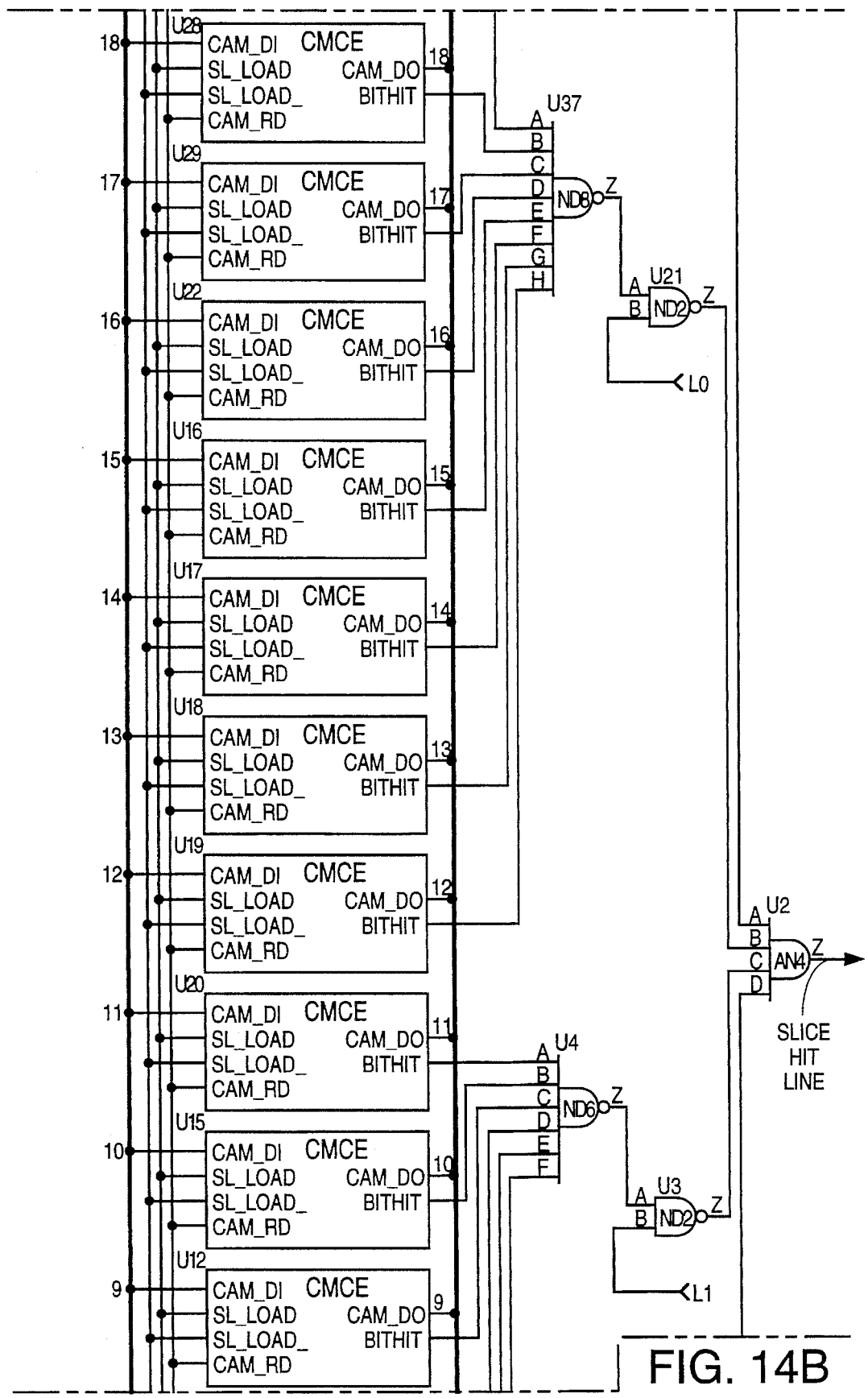
Figure 14C:
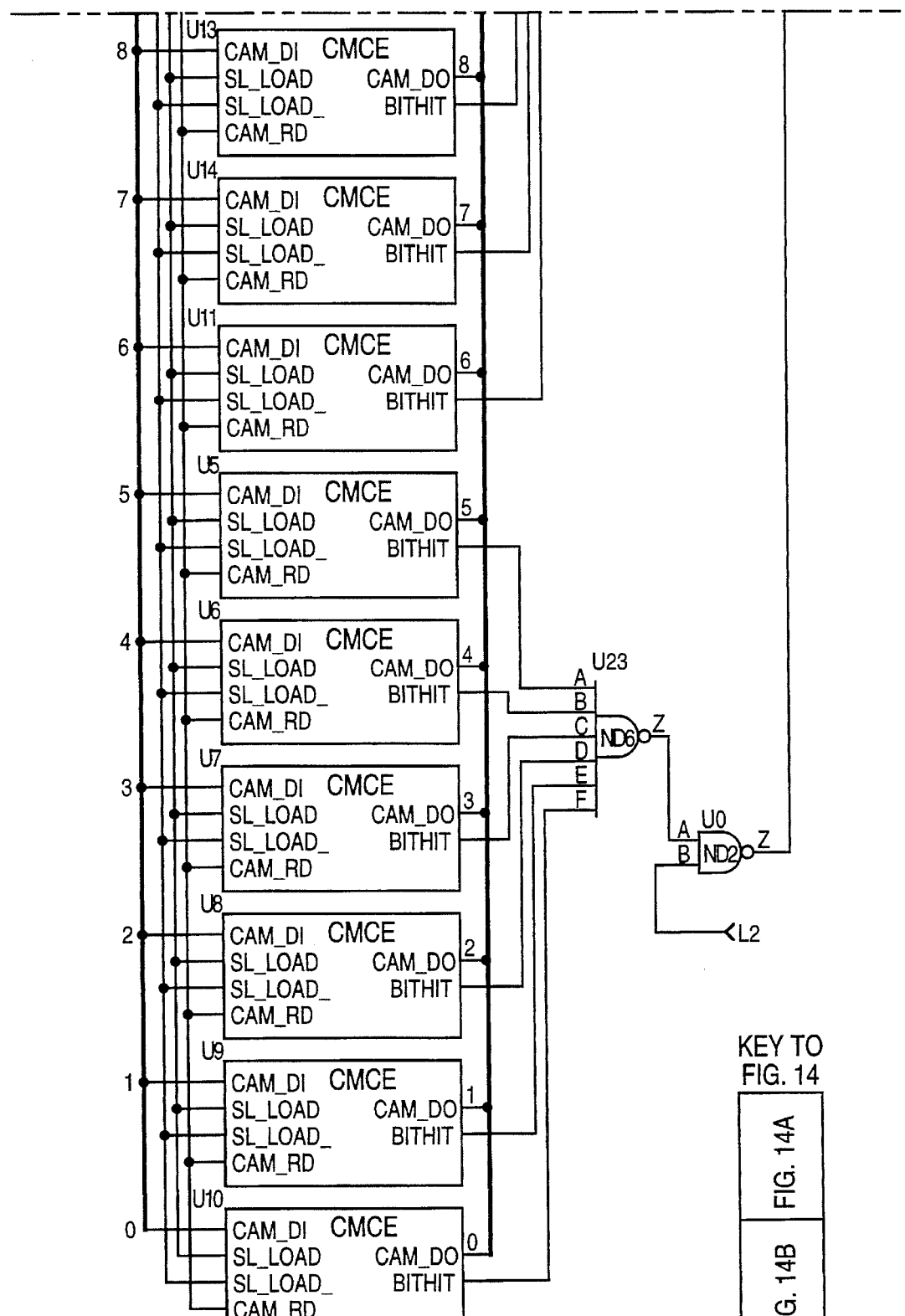

Finally, FIGS. 14(A)–14(C) show a functional model of a CAM portion CMSL 62. A plurality of latches labelled CMCE are included in CMSL 62. CMSL 62 includes a twenty-eight bit input bus and a twenty-eight bit output bus, as explained earlier.

Figure 15A:
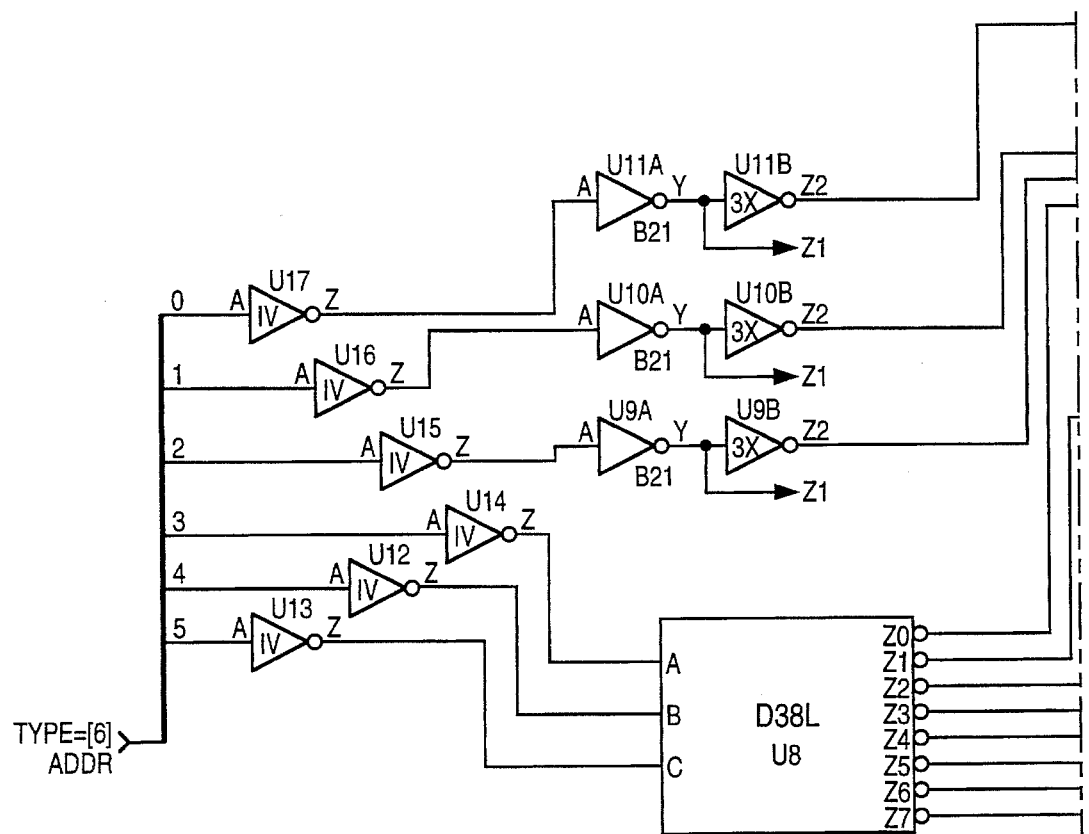
Figure 16A:
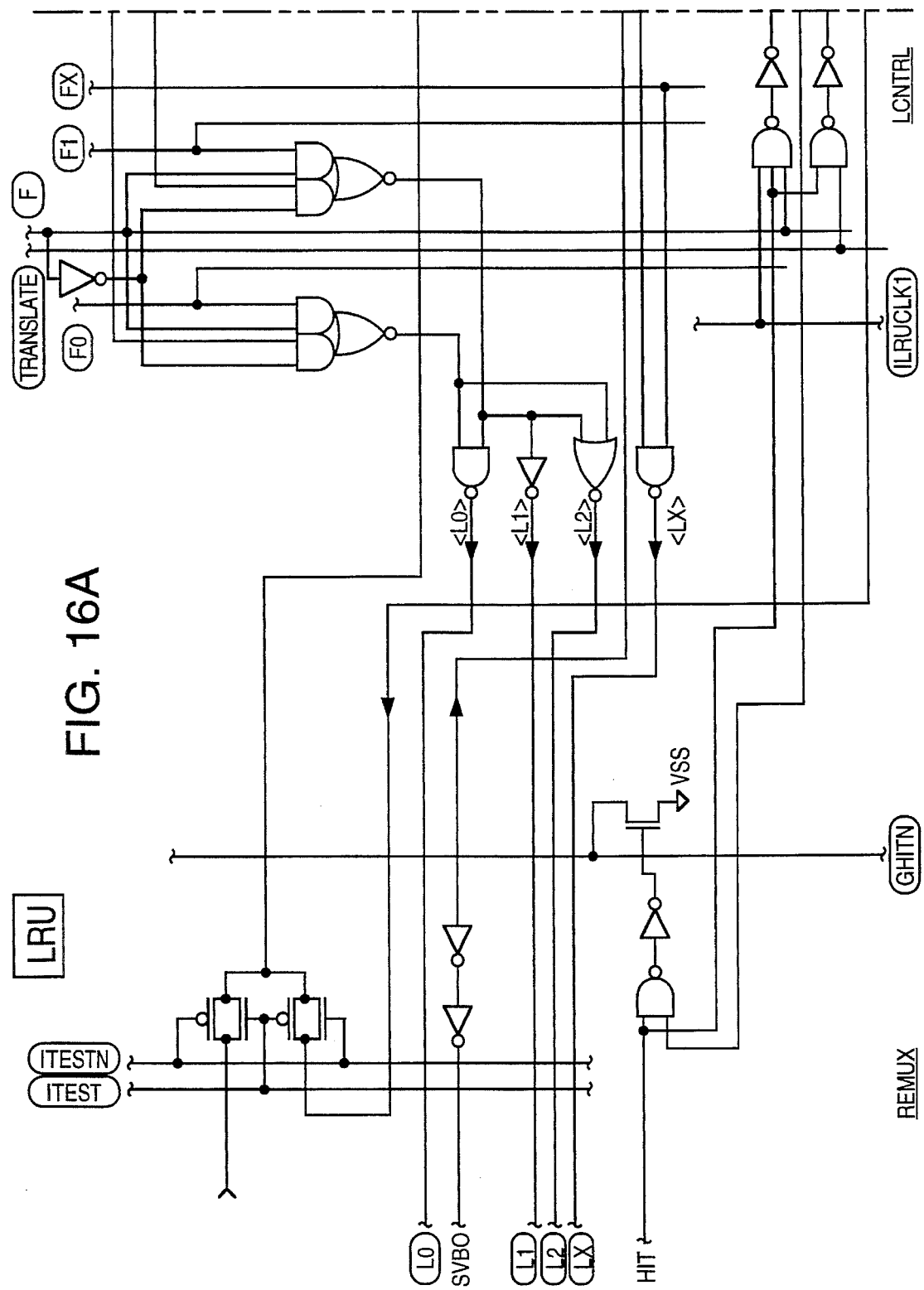
FIGS. 16(A)–16(D) are schematics of portions of a specific embodiment of an LRU section in accordance with the invention.
Figure 16B:
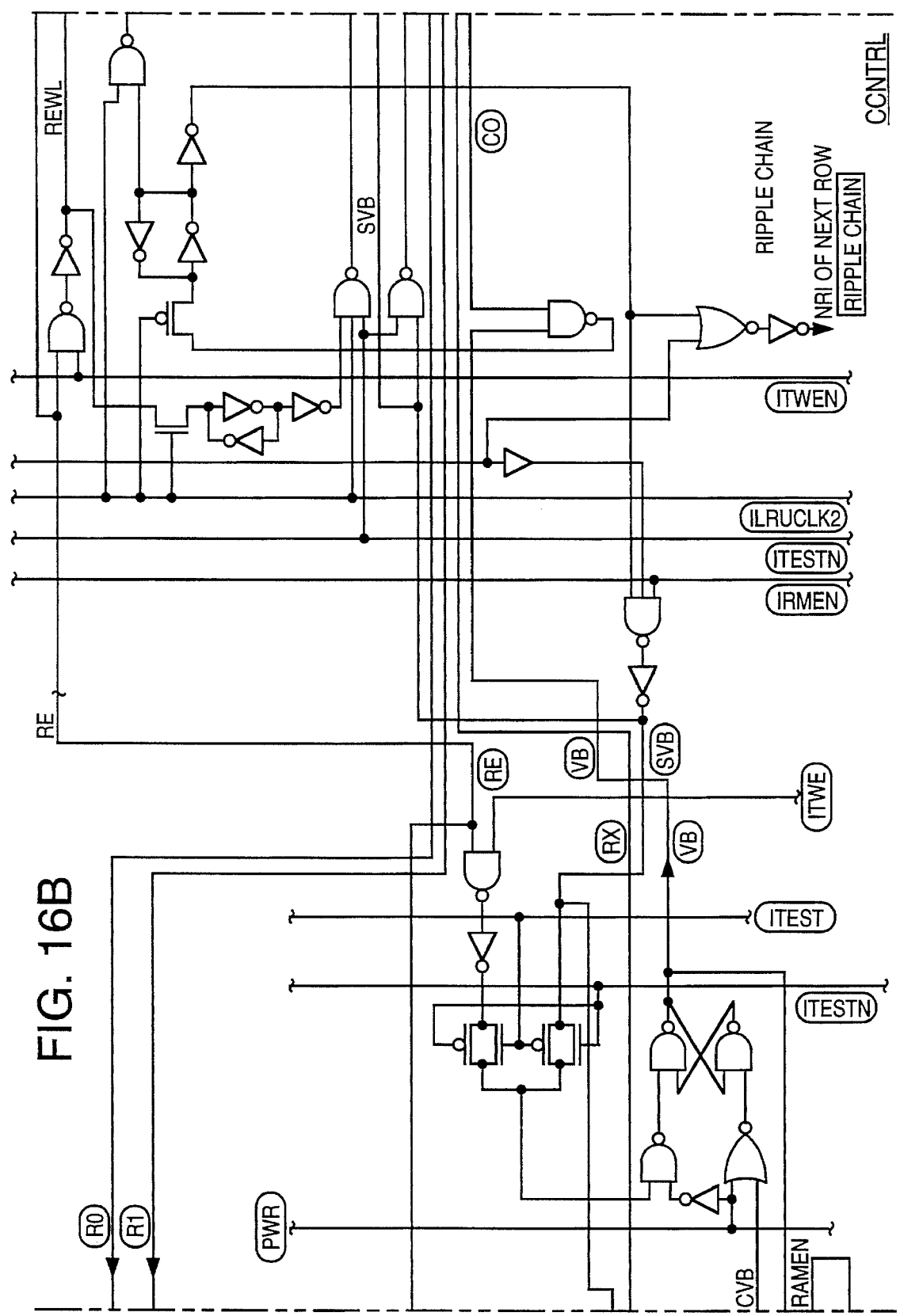
Figure 16C:
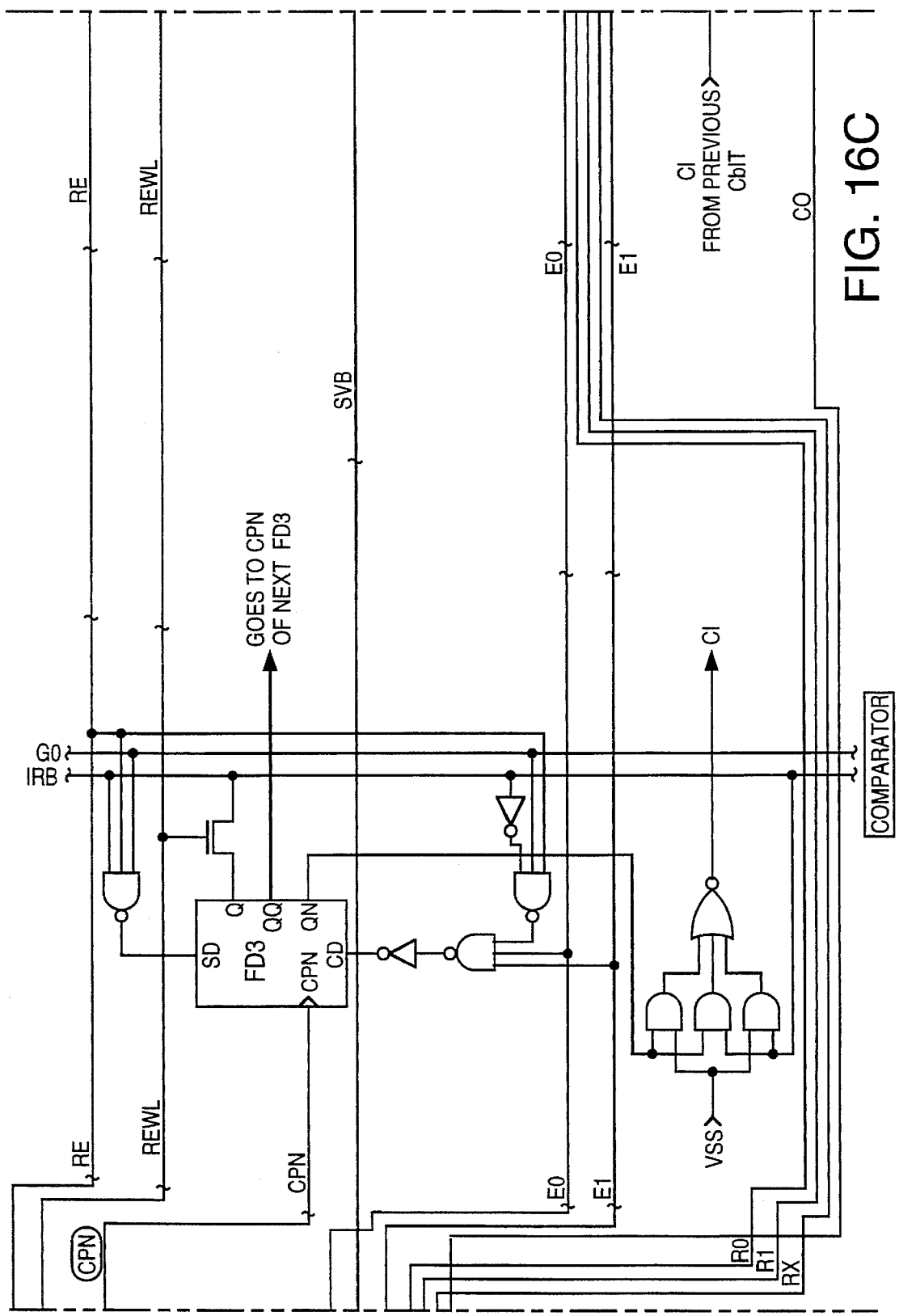
Figure 16D:
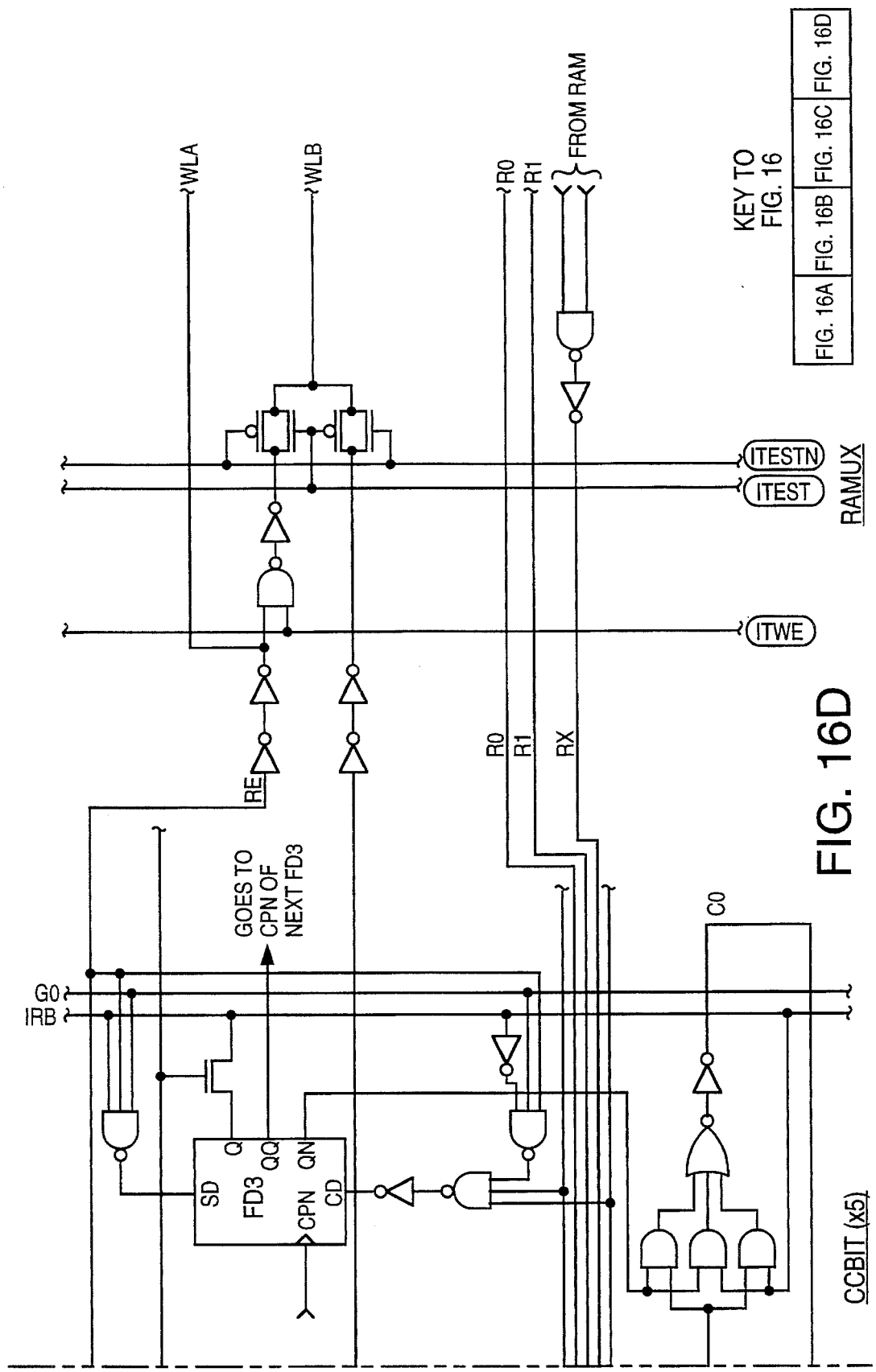

FIGS. 15(A)–15(B) show a schematic of address decoder circuitry used for testing the TLB. The address decoder circuitry has a six line input at the ADDR bus, a sixty-four line output at the WD_LINE bus, and includes nine 3 by 8 decoders U0–U8 and twelve inverters U9–U17. Each output line is connected to a separate slice of the TLB.

Figure 17:
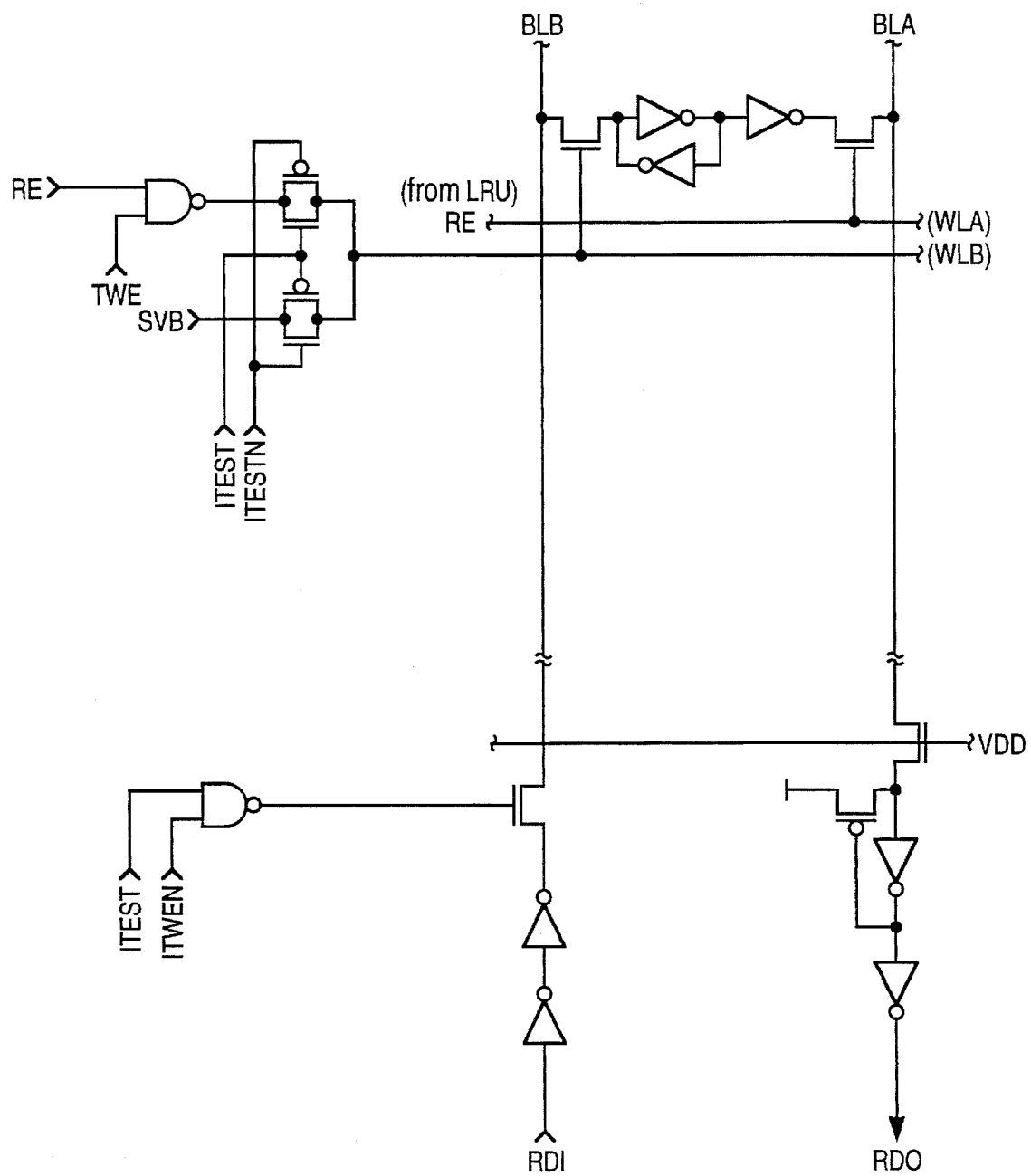
FIG. 17 shows a schematic of a portion of a specific embodiment of a RAM section in accordance with the invention.
Figure 18A:
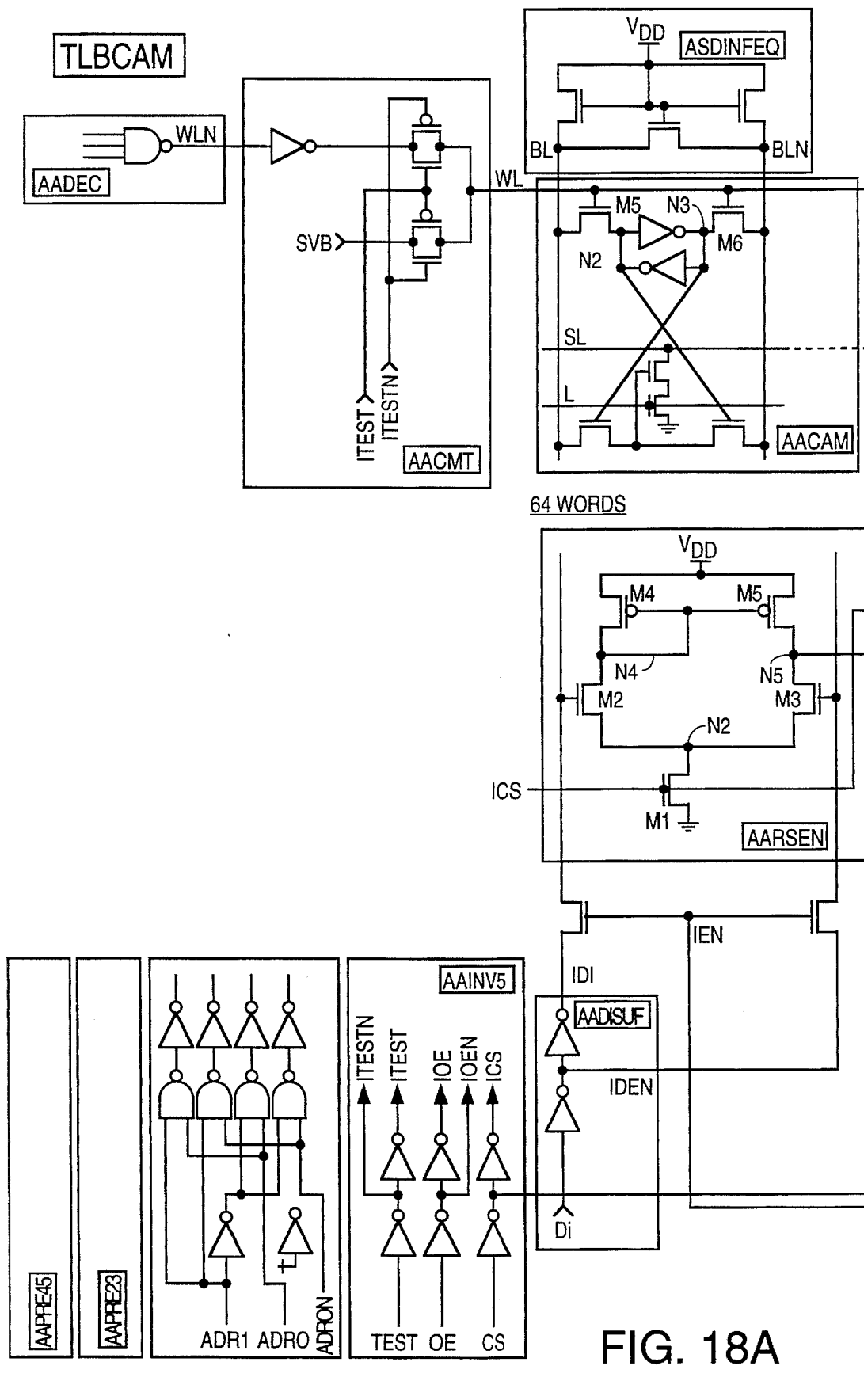
FIGS. 18(A)–18(B) show a schematic of a portion of a specific embodiment of a CAM section in accordance with the invention.
Figure 18B:
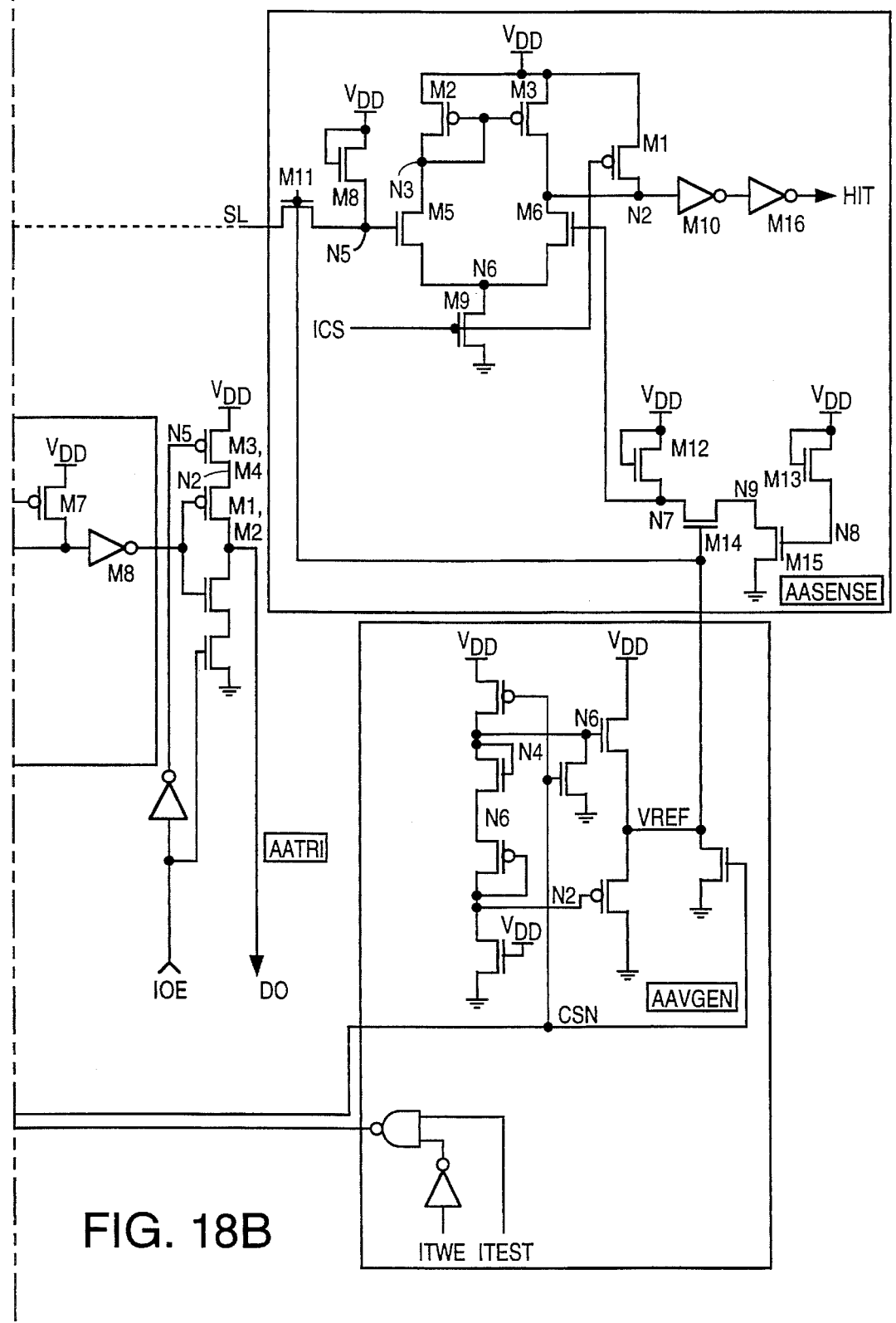

FIGS. 16(A)–16(D) show schematics of customized circuitry within the LRU portion of the TLB. FIG. 17 shows a schematic of customized circuitry within the RAM section of the TLB. Finally, FIGS. 18(A)–18(B) show a schematic of customized circuitry within the CAM section of the TLB. The customized circuitry of FIGS. 16–18 perform the functions as modelled by the circuits of FIGS. 9–14. Due to the customized circuitry, the size of the TLB required for fabrication is smaller as compared to that required for a conventional logic implementation.

FIGS. 18(A)–18(B) include a customized circuit which performs the test address decoding function as modelled by the circuit of FIGS. 15(A)–15(B). Required circuit area is minimized since selected lines and logic are utilized by both the CAM portion and by the test address decoder.

In one embodiment, the TLB is incorporated within a memory management integrated circuit. The memory management integrated circuit is described in the publication entitled "L64815 Memory Management, Cache Control, and Cache Tags Unit Technical Manual" available from LSI Logic Corporation, Milpitas, Calif. The above document is incorporated herein by reference.

The invention is applicable to translation lookaside buffers having any number of slices. In addition, the invention is applicable to translation lookaside buffers used in systems having wider or narrower physical and virtual memory bit-widths.

A TLB generating computer program may be used to facilitate design and layout of the TLB. Such a TLB generator accepts input data which determines the size and bit widths of a desired TLB. The TLB generator correspondingly provides as an output the design and layout characteristics required for the fabrication of the desired TLB.

The embodiment described above is intended to be exemplary and not limiting. In view of the above disclosure, modifications will be obvious to one of ordinary skill in the art without departing from the scope of the invention.

We claim:

1. A translation lookaside buffer comprising:
   a plurality of first storage locations for storing virtual addresses, each of said virtual addresses comprising a plurality of bits;
   a plurality of second storage locations, each of said second storage locations for storing a physical address corresponding to one of said virtual addresses and for storing a plurality of mask bits corresponding to said one of said virtual addresses, there being an equal number of first and second storage locations;
   comparator means connected to said plurality of first storage locations for determining whether a particular virtual address is stored within one of said plurality of first storage locations; and
   masking means connected to said comparator means for masking selected individual ones of said bits of said virtual addresses stored in said first storage locations, said individual ones of said bits of said virtual addresses selected depending upon said plurality of stored mask bits in said second storage locations;

wherein said masking means is selectively controllable to simultaneously mask a first set of the bits of a first virtual address during a single virtual-to-physical address lookup.

2. The translation lookaside buffer according to claim 1 wherein said masking means is also for flushing translation entries within a selected range of virtual addresses.

3. The translation lookaside buffer (TLB) according to claim 1, said TLB further comprising:

a plurality of testing input lines for providing external signals to test the operation of the TLB; and an address decoder coupled to said plurality of first storage locations and also coupled to said plurality of testing input lines, said address decoder being usable to access said first storage locations through said plurality of testing input lines.

* * * * *

UNITED STATES PATENT AND TRADEMARK OFFICE
CERTIFICATE OF CORRECTION

PATENT NO.   : 5,491,806
DATED        : Feb. 13, 1996
INVENTOR(S)  : Jens Horstmann and Yoon Kim It is certified that error appears in the above-identified patent and that said Letters Patent is hereby corrected as shown below:

Col. 8, line 55, delete "and comparing only" and substitute --but not masking--.

Col. 13, line 54, delete "LK" and insert --LX--.

Signed and Sealed this

Eleventh Day of March, 1997

Attest:

Attesting Officer

BRUCE LEHMAN

Commissioner of Patents and Trademarks